(12) United States Patent
Uchida et al.

(10) Patent No.: US 8,955,048 B2
(45) Date of Patent: Feb. 10, 2015

(54) CONFERENCE DATA MANAGEMENT

(71) Applicants: Yuki Uchida, Lincoln Park, NJ (US); Shun Tanaka, West New York, NJ (US)

(72) Inventors: Yuki Uchida, Lincoln Park, NJ (US); Shun Tanaka, West New York, NJ (US)

(73) Assignee: Ricoh Company, Ltd., Tokyo (JP)

(\*) Notice: Subject to any disclaimer, the term of this patent is extended or adjusted under 35 U.S.C. 154(b) by 154 days.

(21) Appl. No.: 13/685,849

(22) Filed: Nov. 27, 2012

(65) Prior Publication Data

US 2014/0150059 A1 May 29, 2014

(51) Int. Cl.
*G06F 17/30* (2006.01)
*H04L 29/06* (2006.01)

(52) U.S. Cl.
CPC .......... *G06F 17/30943* (2013.01); *H04L 63/08* (2013.01)
USPC ............................................................. 726/3

(58) Field of Classification Search
CPC ................................... G06F 15/16; G06F 7/06
USPC ............................................................. 726/3
See application file for complete search history.

(56) References Cited

U.S. PATENT DOCUMENTS

| | | | |
|---|---|---|---|
| 2008/0263010 A1* | 10/2008 | Roychoudhuri et al. | 707/3 |
| 2009/0049520 A1* | 2/2009 | Kubota | 726/3 |
| 2011/0022968 A1* | 1/2011 | Conner et al. | 715/753 |
| 2013/0145284 A1* | 6/2013 | Anantharaman et al. | 715/753 |
| 2013/0211868 A1* | 8/2013 | DeLuca | 705/7.19 |

\* cited by examiner

*Primary Examiner* — Teshome Hailu
*Assistant Examiner* — Thanh Le
(74) *Attorney, Agent, or Firm* — Cooper & Dunham LLP

(57) ABSTRACT

Tools are provided for conducting a conference/meeting and/or obtaining, managing and archiving conference/meeting data. For example, a conference application can be provided through a network to a registrant or participant of the conference. The conference application allows the registrant or participant to access conference data (such as presentation slides, conference materials, other posted content, etc.), save comments, files, other content, etc., make revisions to the conference data, and share data with other registrants or participants of the conference.

20 Claims, 38 Drawing Sheets

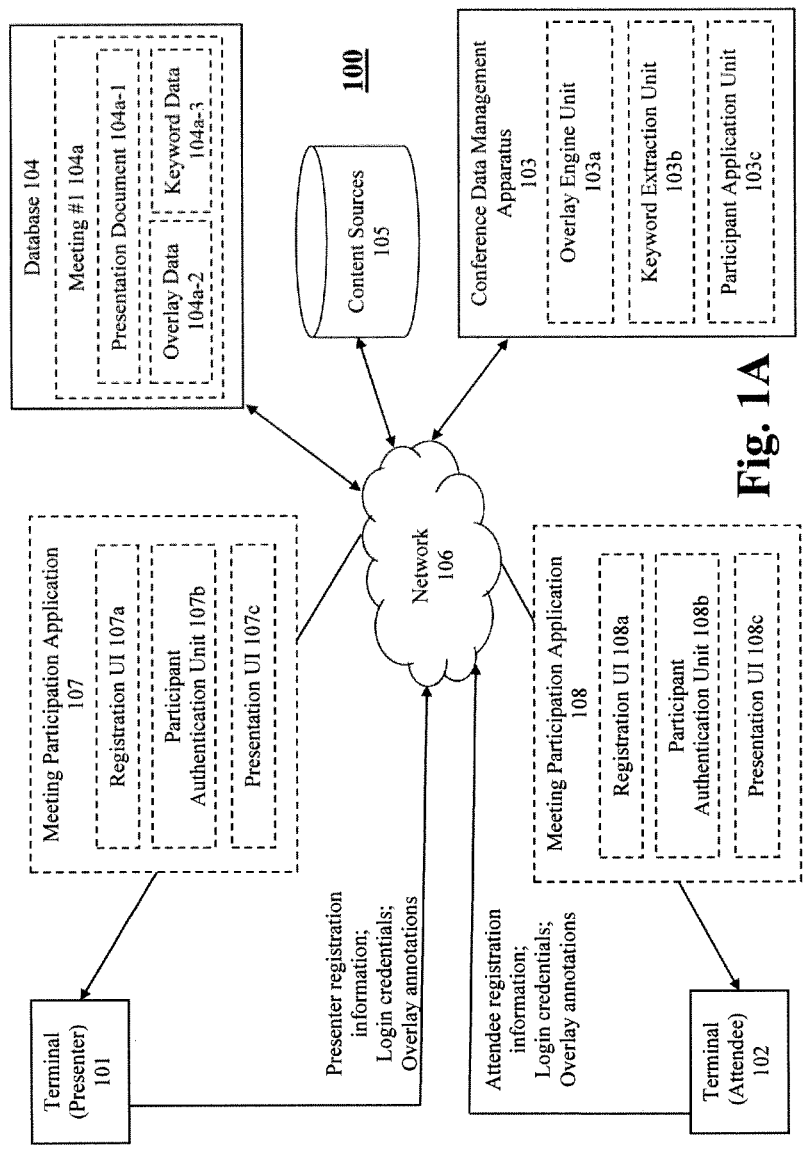

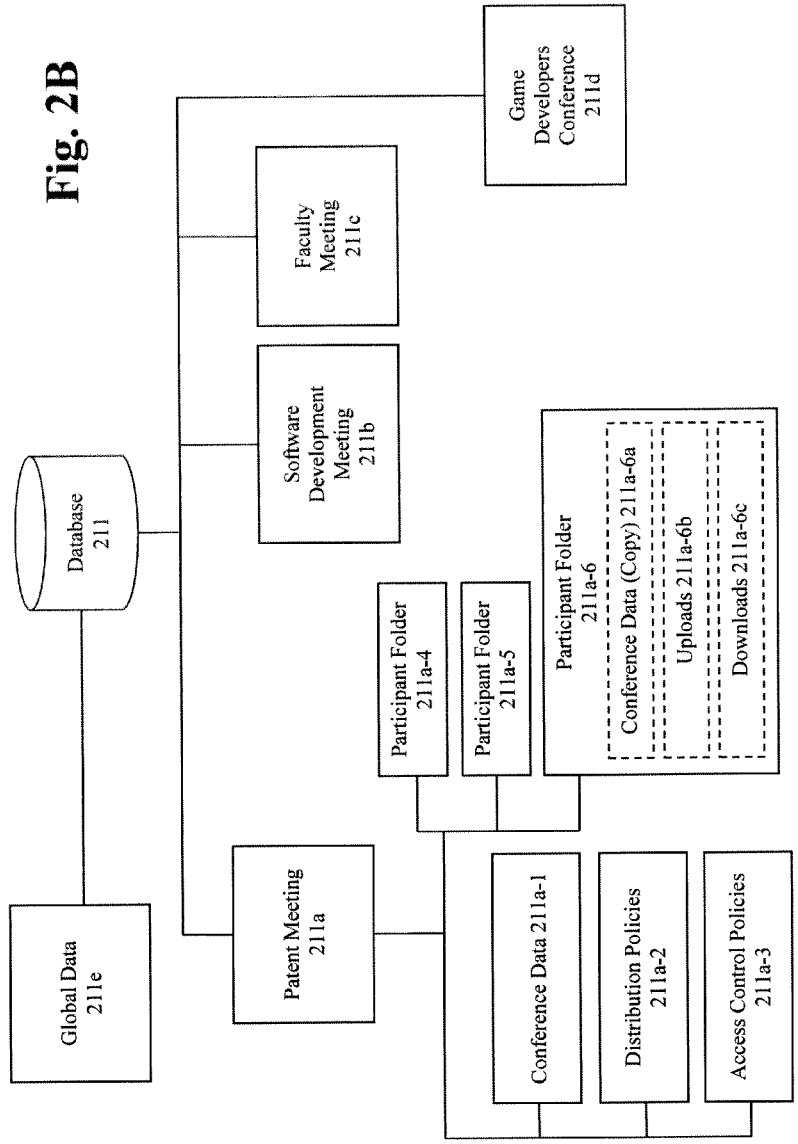

Meeting Information

| Meeting ID | Name | Date/Time |
|---|---|---|
| 1 | Meeting#1 | 04/05/2012 13:00 |
| 2 | Meeting#2 | 04/10/2012 10:00 |

Overlay Data Information

| File ID | Meeting ID | File URL |
|---|---|---|
| 1 | 1 | http://xxx/meetingA/m.pdf |
| 2 | 1 | http://xxx/meetingA/m1.pdf |
| 3 | 2 | http://xxx/meetingB/n.pdf |

Participant Information

| Participant ID | Meeting ID | Name |
|---|---|---|
| 1 | 1 | Jim |
| 2 | 1 | Tom |
| 3 | 2 | Greg |
| 4 | 2 | Helen |

Keyword Information

| Keyword ID | Meeting ID | Keyword |
|---|---|---|
| 1 | 1 | Tablet |
| 2 | 1 | OS |
| 3 | 1 | Ratio |
| 4 | 1 | Share |
| 5 | 1 | Wifi |
| 6 | 2 | Tablet |
| 7 | 2 | iPad |
| 8 | 2 | Galaxy |
| 9 | 3 | 100g |
| 10 | 3 | Firewall |
| 11 | 3 | NAT |
| 12 | 3 | Wifi |

Fig. 9

Overlay Data and Author Information

| File ID | File URL | Author ID | Author Name |
|---------|----------|-----------|-------------|
| 1 | http://xxx/meetingA/ol1.pdf | 1 | Adam Smith |
| 2 | http://xxx/meetingA/ol2.pdf | 2 | Michael Page |
| 3 | http://xxx/meetingA/ol3.pdf | 3 | Greg Patterson |
| 4 | http://xxx/meetingB/ol1.pdf | 1 | Adam Smith |
| 5 | http://xxx/meetingB/ol2.pdf | 4 | Christine Wolfe |

Fig. 10

Overlay Data Access Information

| File ID | File URL | Access Type |
|---|---|---|
| 1 | http://xxx/meetingA/ol1.pdf | Public |
| 2 | http://xxx/meetingA/ol2.pdf | Private |
| 3 | http://xxx/meetingA/ol3.pdf | Presenter only |
| 4 | http://xxx/meetingB/ol1.pdf | Admin only |
| 5 | http://xxx/meetingB/ol2.pdf | Same department only |

Fig. 11

Saved Content Information

| File ID | Meeting ID | Content Source Location | Saved Location | Time of Archival |
|---|---|---|---|---|
| 1 | 1 | http://xxx/docs/patent101.pdf | Z:\meeting1\content\patent101.pdf | 01-12-2012 19:11 |
| 2 | 1 | X:\sound_files\Speech_1.mp3 | Z:\meeting1\content\Speech_1.mp3 | 01-12-2012 19:11 |
| 3 | 1 | http://yyy/video1.wmv | Z:\meeting1\content\video1.wmv | 01-12-2012 19:12 |
| 4 | 2 | http://zzz/cited_art/Ref1.pdf | Z:\meeting2\content\Ref1.pdf | 03-19-2012 09:59 |
| 5 | 2 | http://zzz/cited_art/Ref2.pdf | Z:\meeting2\content\Ref2.pdf | 03-19-2012 09:59 |

Fig. 12

PARTICIPANT REGISTRATION

Conference Name: Patent Prosecution 101
Conference Date: November 11, 2012
Conference Location: 30 Rockefeller Plaza ☐ Attending
☐ Not Attending Back    Submit

Fig. 14B

DATA DISTRIBUTION REQUEST

Logged in as JIM_10 (logout)

Currently selected:
Patent_Prosecution_101_annotated.pdf
(change)

You are about to request distribution of the file selected above to the following recipients:

(X) Other Attendees ( ) Other Invitees ( ) Custom: _____ [ADD]

<u>Back</u>    <u>Submit</u>

Fig. 14E

Meeting Information

| Meeting ID | Name | Date/Time |
|---|---|---|
| 1 | Meeting#1 | 04/05/2012 13:00 |
| 2 | Meeting#2 | 04/10/2012 10:00 |

Personal Folder Information

| Participant ID | Name | Folder Address |
|---|---|---|
| 1 | ID 10: Jim | http://xxx/meetingA/JIM_10/ |
| 2 | ID 23: Tom | http://xxx/meetingA/TOM_23/ |
| 3 | ID 25: Greg | http://xxx/meetingA/GREG_25/ |
| 4 | ID 87: Helen | http://xxx/meetingA/HELEN_87/ |
| 5 | ID 99: Peter | http://xxx/meetingA/PETER_99/ |
| 6 | ID 103: Christine | http://xxx/meetingA/CHRISTINE_103/ |

Participant Information

| Participant ID | Meeting ID | Name | File ID | Attendee Status | Delegate Information |
|---|---|---|---|---|---|
| 1 | 1 | ID 10: Jim | 1 | 'Accepted' | N/A |
| 2 | 1 | ID 23: Tom | 2 | 'Declined' | N/A |
| 3 | 1 | ID 25: Greg | 3 | 'Invited' | N/A |
| 4 | 1 | ID 87: Helen | 4 | 'Attended' | N/A |
| 5 | 1 | ID 99: Peter | 5 | 'Delegator' | ID 103: Christine |
| 6 | 1 | ID 103: Christine | 6 | 'Attending (delegate)' | ID 99: Peter |

Fig. 17

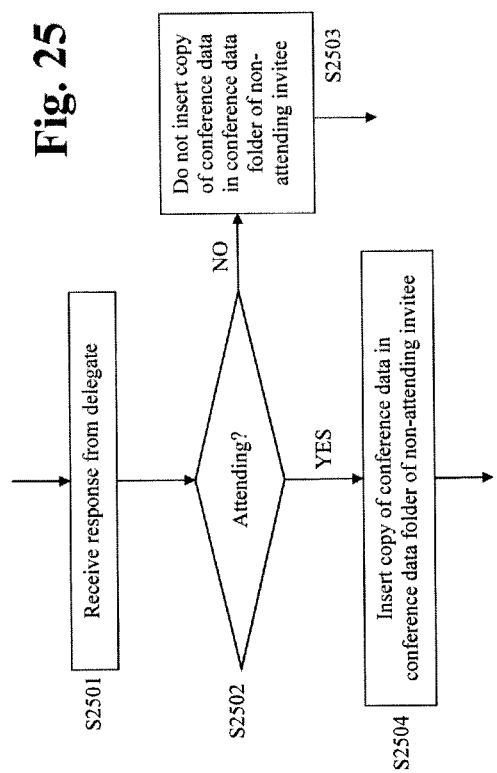

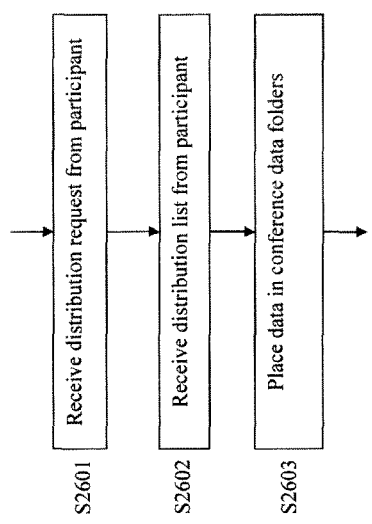

CONFERENCE DATA MANAGEMENT

TECHNICAL FIELD

This disclosure relates to tools (such as, for example, systems, apparatuses, methodologies, applications, other computer programs, etc.) for conducting conferences and/or obtaining, managing and archiving conference data.

BACKGROUND

In the current digital age, the trend is that more and more tasks involve use of information technology (IT) and digital media.

For example, meetings or conferences are now often conducted virtually (e.g., through a network) and/or via mixed communication media (e.g., in person supplemented by delivery of meeting content through a network). At a meeting, when a presenter is giving a presentation to the attendees of the meeting, printed copies of the presentation slides are often made available to the attendees. The attendees of the meeting often take notes or make annotations directly onto the printed slides. With today's technology, such attendees can access the presentation slides on their mobile devices (such as a tablet, handset, etc.). In addition, other information may be exchanged and/or considered during the meeting, in addition to the presentation slides.

As an example, a presenter making the presentation may supply additional materials or information that is not in the slides, or a participant may utilize a network-connected terminal to retrieve materials or content via the network. Further, the meeting participant may take notes or make annotations via a software application, or on a hardcopy of the slides or other sheets.

However, it takes some personal discipline and self-organization by the participant to collect together all of the materials, information and content that was considered during the meeting. If such archiving is not performed at (or shortly after) the conclusion of the meeting, the materials, information or content may be lost, or at least difficult to locate, at a later time.

There is a need for tools to manage and archive such materials, information and content.

Further, there may be instances in which the notes and annotations of participants may be of interest to others (such as the presenter, a meeting organizer, a manager, other participants, etc.), for assorted reasons. One possible way of finding out such information would be to analyze the notes and annotations, either on paper or digitally. However, such approach assumes that the participants willingly take additional steps to make the notes or annotations available, which may involve a cumbersome process.

There is a need for more convenient ways to share the work product generated by the participants of a meeting.

SUMMARY

This disclosure provides tools (for example, systems, apparatuses, methodologies, applications, other computer programs, etc.) for conducting conferences and/or obtaining, managing and archiving conference data. Various features may be included in such tools.

For example, conference data for a particular conference or meeting (the terms "conference" and "meeting" are used interchangeably herein) is stored in a conference database, and may include presentation slides, supplemental materials to be distributed at the conference, and other resources related to the conference.

In an aspect of this disclosure, when a conference is initially registered, along with a list of invitees, in the conference database, an invitation is transmitted to each particular invitee on the list, and a conference data folder is added to the conference database for the exclusive use of the particular invitee. When presentation slides and other materials are distributed, a copy of the materials to be distributed is automatically placed in the conference folder of each invitee. When the invitee registers to attend the conference, all of the materials in the conference folder created for the registered invitee, as conference registrant, are available to the registrant, such as via a conference application. Further, the registrant can add, via the conference application, additional materials, such as notes, documents, other content, etc., to the folder. In some instances, the registrant will save a link to a specified location where additional materials and/or content that may be relevant to the conference can be found.

The conference application may allow the registrant to view a list of the registrants of the conference, and the registrant can pick and choose invitees and/or registrants to whom added materials may be distributed, or allow the registrant to specify a distribution policy regarding distribution of such added materials. Alternatively, the distribution policy may be one specified by a conference administrator, or added materials may be distributed according to a default distribution policy. In addition, the conference application may also allow the registrant to specify who can access the materials and content in the folder that is allocated to the registrant. For example, the registrant may allow all other registrants to access the data in his/her folder, or only a select group of invitees or registrants (such as members of his/her workgroup, or another specified group), or no one at all. Further, the conference application may allow the registrant to specify which materials and content in the folder will be accessible by others.

When the conference starts (as well as thereafter), the conference participant has access to all of the materials placed in the participant's personal conference folder, maintained in the conference database by the system, including distributed conference materials as well as materials, data and links that the participant saved in the conference folder. The conference application allows the participant to access such folder in the conference database from a mobile terminal, the participant's desktop computer, a home computer, etc.

In another aspect, an invitee can designate a delegate to be invited to the conference in addition to, or in place of, the invitee. In the case of a non-attending invitee who has designated a delegate, when conference materials and/or other content are distributed and/or otherwise made available to the delegate, such data may also be optionally available to such non-attending invitee.

Further, the conference data maintained in the conference database corresponding to the particular conference may be configured such that data added during the conference can be distinguished from the data that is in the database at the commencement of the conference. For example, the materials that are in the participant's folder at the commencement of the conference may be locked and archived as pre-meeting data, and the data added during the conference (such as overlay notes, other content, etc.) may be deemed to be data representative of the discussion or discourse, or thoughts stimulated by said discussion or discourse. On the other hand, data added after the meeting may be archived in one or more additional stages.

BRIEF DESCRIPTION OF THE DRAWINGS

The aforementioned and other aspects, features and advantages can be better understood from the following detailed description with reference to the accompanying drawings wherein:

FIG. 1A shows a block diagram of a system, according to an exemplary embodiment;

FIG. 2B shows a configuration of a meeting database, according to another exemplary embodiment;

FIG. 9 shows tables stored in a meeting database in an exemplary embodiment;

FIG. 10 shows overlay data and author information, according to an exemplary embodiment;

FIG. 11 shows overlay data access information, according to an exemplary embodiment;

FIG. 12 shows saved content information, according to an exemplary embodiment;

FIG. 14B shows another sample user interface according to an exemplary embodiment;

FIG. 14E shows another sample user interface according to an exemplary embodiment;

FIG. 17 shows tables stored in the meeting database in an exemplary embodiment, the tables corresponding to the structure shown in FIG. 16;

FIG. 25 shows a method of handling registration of a delegate, according to an exemplary embodiment; and FIG. 26 shows a method of processing a distribution request, according to an exemplary embodiment.

DETAILED DESCRIPTION

Figure 1B:
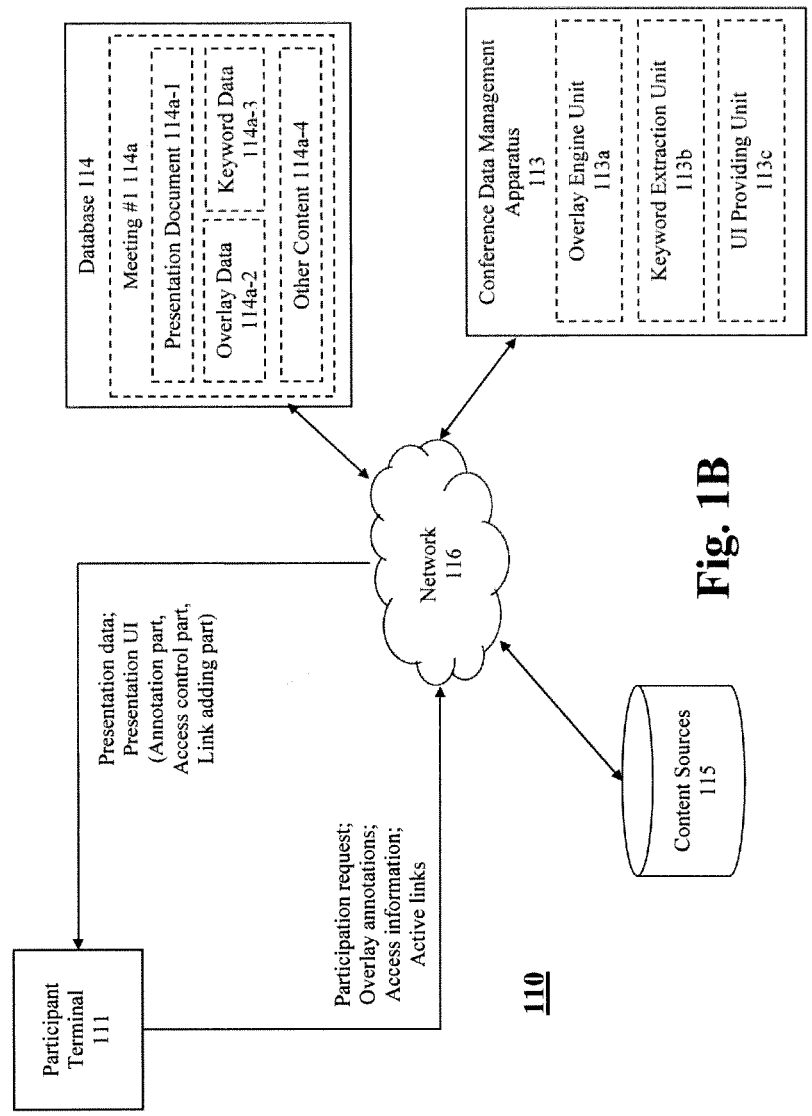
FIG. 1B shows a block diagram of a system, according to another exemplary embodiment.

In this disclosure, tools are provided for conference data management services (e.g. data distribution, annotation extraction, document categorization and document archival).

In the present application, most of the discussion is done using the example of a conference. However, the embodiments of the present application are also applicable to meetings, lectures, or any other event involving a document to be presented to one or more participants.

Referring now to the drawings, wherein like reference numerals designate identical or corresponding parts throughout the several views, FIG. 1A shows a block diagram of a system 100, according to an exemplary embodiment of the present disclosure. The system 100 includes terminals 101 and 102, a conference data management apparatus 103, a database 104 and content sources 105, all of which are interconnected by a network 106. The conference data management apparatus 103 includes an overlay engine unit 103a, a keyword extraction unit 103b and a participant application unit 103c. The participant application unit 103c of the conference data management apparatus 103 provides, via the network 106, meeting participation applications 107 and 108 to terminals 101 and 102, respectively. The meeting participation applications 107 and 108 contain registration UIs 107a and 107b, participant authentication unit 107b and 1086, and presentation UIs 107c and 108c, respectively.

The terminal 101 represents a terminal device of a presenter at a conference (or a meeting, a lecture, etc.). The terminal 101 is used by the presenter, for example, to view the presentation file at the conference, and make overlay annotations to such presentation file. Similarly, the terminal 102 represents a terminal device used by an attendee at the conference to view the presentation files and make overlay annotations to presentation files. As illustrated in FIG. 1A, the terminals 101 and 102 are provided with the meeting participation applications 107 and 108, respectively, and the terminals 101 and 102 provide registration information, login credentials and overlay annotations to the conference data management apparatus 103 via the network 106. The registration information is utilized by the conference data management apparatus 103 to register the user of the terminals 101 and 102 (i.e. presenter or attendee) as a participant, allowing the user to access the various services provided by the conference data management apparatus 103. The login credentials are utilized by the conference data management apparatus 103 to verify that the user is authorized to participate in the conference. In addition, in a case that the user wishes to retrieve overlay annotations of another participant of the conference, the login credentials may be used to verify that the user has access to the particular overlay annotations of said another user.

The terminals 101 and 102 are preferably equipped with a touch-sensitive display wherein the presenter or the attendee can use his or her finger or other input device (stylus, etc.) to make overlay annotations to the presentation document provided by the meeting participation applications 107 and 108. Additionally, the terminals 101 and 102 may also be equipped with a physical keyboard or have a way of displaying a graphical keyboard such that the presenter or the attendee (collectively referred to as participants) include his or her notes and make additional comments on the presentation document. Such functionalities are further described infra in connection with FIG. 3.

The terminals 101 and 102 can be any computing device, including but not limited to a personal, notebook or workstation computer, a kiosk, a PDA (personal digital assistant), a mobile phone or handset, a tablet, another information terminal, etc., that can communicate with other devices through the network 106. Although only two terminals are shown in FIG. 1A, it should be understood that the system 100 can include a plurality of terminals (which can have similar or different configurations). The terminals 101 and 102 are further described infra with reference to FIG. 4.

The conference data management apparatus 103 includes an overlay engine unit 103a, a keyword extraction unit 103b and a participant application unit 130c.

The overlay engine unit 103a of the conference data management apparatus 103 associates a presentation document with overlay data. The overlay data, which is received by the conference data management apparatus 103 from the user terminal 101, includes annotations made by the user of the user terminal 101 on the presentation document of the conference. The overlay annotations may include underlining, highlighting or circling of words or phrases or handwritten or typed comments on various locations (e.g. in the margins) of the presentation document. Such overlay data received from the user terminal 101 is associated with the conference (e.g. by using a unique ID assigned to the conference) in a meeting database (e.g. the database 104). As shown in the example of FIG. 9 ("overlay annotation file information"), the file ID, meeting ID and file URL may be stored in a table to keep track of which overlay data belongs to which conference.

The keyword extraction unit 103b of the conference data management apparatus 103 recognizes keywords in the received overlay data.

Conventional edge detection methods may be used to extract overlay annotations from the overlay data. For example, the keyword extraction unit 103b of the conference data management apparatus may select a pixel from the image portion of the overlay data and sequentially compare the brightness of neighboring pixels, proceeding outward from the selected pixel. In doing so, if a particular adjacent pixel has a brightness value that is significantly greater or less than the selected pixel (e.g. exceeding a threshold value), the adjacent pixel may be determined to be an edge pixel delimiting an overlay object. Once all of such edge pixels are determined, the overlay object can be recognized. Such a process can be repeated until the keyword extraction unit 103b has examined all the pixels in the image portion of the overlay data to extract one or more overlay objects from the overlay data received via the meeting participation application. However, the algorithm used by the keyword extraction unit 103b is not limited to the one discussed above, and any well-known detection methods not discussed herein (e.g. Canny algorithm) may be used to extract overlay objects from the overlay data.

In the case of overlay data including non-graphical items such as a voice note, conventional speech recognition methods may be used to extract words or phrases from such portion of the overlay data. Such speech recognition methods may be based on any conventional algorithm, such as Hidden Markov Models, dynamic time warping or neural networks. Such algorithms are well known in the art and for the sake of brevity, not discussed here.

Once all the overlay objects in the received overlay data are recognized, such overlay objects may be used to identify keywords to be associated with the specific presentation.

For example, if the extracted overlay object is a circle (e.g. any kind of closed loop), the keyword extraction unit 103b may recognize the word or phrase enclosed by the circle as keywords. If the extracted overlay object is in the shape of an underline, the keyword extraction unit 103b may recognize the word or phrase located on top of such underline as keywords. If the extracted overlay object includes a string of recognizable characters (e.g. a comment written by a participant in the margin), the keyword extraction unit 103b may recognize the string of characters as keywords. In recognizing words or phrases as keywords, the keyword extraction unit 103b may filter such words or phrases such that only meaningful or informative words or phrases are recognized as keywords. For example, if the keyword extraction unit 103b detects a phrase "Great point!" in the margin of a presentation slide, such phrase may not be recognized as keywords with which the conference may be associated in the meeting database, since such phrase does not provide any useful information. However, such a phrase may still be monitored to collect information about the conference (e.g. to assess participant feedback or satisfaction), as discussed infra. On the other hand, if the recognized phrase is "Compare with iPad" for example, the keyword extraction unit 103b may recognize the word "iPad" as a keyword and store the keyword in the meeting database in association with the conference. An example of such meeting database is shown in FIG. 9 ("keyword information").

In addition to extracting the keywords, the location of such keywords may also be recorded for analytics purposes. For example, if a particular section within a presentation is receiving a disproportionate number of comments from the audience, such statistic may indicate that the particular section (and the topic that is covered in the particular section) is controversial, helpful or intriguing, depending the substance of the comments.

Also, exclamation marks ("!!!") or asterisks ("***") are often used to indicate the significance of a particular point made in a document. Such indicators are recognized and matched up with statements or diagrams adjacent to the indicators (for example, by detecting the word closest to the indicator and extracting the sentence or paragraph containing the word), and the matched up pairs are collected for post-conference analysis.

In an exemplary embodiment, content of the conference data stored in the conference database (e.g. conference database 124 of FIG. 1C) may be parsed and categorized based on the keywords found in the conference data. For example, the conference data may include a plurality of documents and other files, and by categorizing such documents and files by certain categories such as topic, author, date, or file type, the participants of the conference accessing the files can navigate through the files more easily. Such categorization can be achieved, for example, by searching through the documents and other files included in the conference data, extracting keywords from each file (e.g. using the extraction methods discussed above), and categorizing the documents and files based on the extracted keywords. The participants of the conference may be able to view the categorized documents and files, for example, in the form of a list or a table.

In addition, participant comments included in the extracted overlay annotations or other files created by the participants of the conference may be categorized into, for example, positive comments and negative comments, and based on the result, presenters or conference organizers may be able to spot a general trend in the reaction of the participants for each of the topics discussed during the conference. For example, a presenter is able to analyze and figure out why some of his statements received more positive or negative comments, and improve his or her future presentations based on such analysis. In addition, participants may be able to see the feedback of other participants of the conference and see how their thoughts differed from his or her own.

The information collected using the extracted keywords or other overlay objects is not limited to the aforementioned examples, and may include a variety of other statistics such as page numbers of the pages containing the annotations, section numbers of the sections containing the annotations, statuses of the participant making the annotations, or any other information that might be used in a post-conference analysis.

Figure 13:
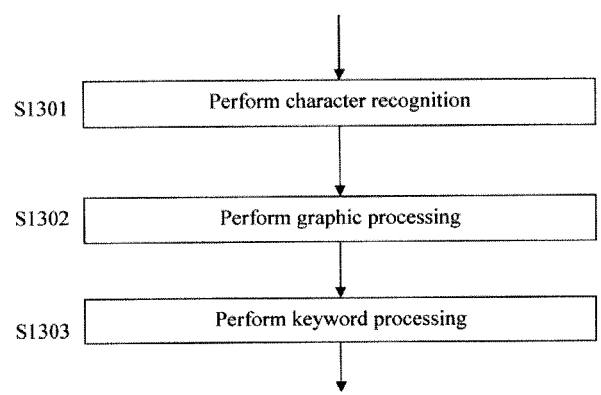
FIG. 13 shows a flowchart for a method of recognizing keywords in overlay data, according to an exemplary embodiment.

The operation of the keyword extraction unit 103*b* is further described infra in connection with the example shown in FIG. 13.

The participant application unit 103*c* of the conference data management apparatus 103 provides a meeting participation application to the user terminal 101.

The meeting participation application 107 includes a registration UI 107*a*, a participant authentication unit 107*b* and a presentation UI 107*c*.

The registration UI 107*a* of the meeting participation application 107 allows a user to register for a specific meeting. For example, the registration UI 107*a* presents to the user, via the user terminal 101, a list of conferences and allows the user to select a particular conference he or she wishes to attend. The list of conferences may be based on whether a particular conference is currently accepting participant registration. For example, the user may only see a list of conferences that are currently accepting participant registration at the moment the user wishes to register for a conference. In another exemplary embodiment, users may be able to register for past or future conferences to retrieve the presentation files related to such conferences.

Once a particular conference is selected by the user, a user request to join the particular conference is sent to the participant authentication unit 107*b* of the meeting participation application 107, and the participant authentication unit 107*b* authenticates the user request to join the conference based on, for example, user credentials submitted by the user. However, in a case that the particular conference is public and open to anyone, such login credentials may not be required.

A user may have to be authenticated before he or she can successfully register for a conference and thus be able to participate in the conference and access the presentation files related to the conference may depend on the login credentials supplied by the user.

For example, the participant authentication part 107*b* may maintain user authentication information for each conference, and when the participant authentication part 107*b* receives a user request to participate in a specific conference, the participant authentication part 107*b* requests user credentials from the requesting user. If the user credentials provided by the requesting user match one of the entries in the user authentication information maintained for the specific meeting, the user request to participate in the specific meeting is authenticated and the requesting user becomes authorized to participate in the specific meeting. In addition, other verification methods such as one or more biometrics means such as comparing pre-stored fingerprints, palm prints, voice or speech, retinas or irises, facial expressions or features, signature and etc. can be used.

The presentation UI 107*c* of the meeting participation application 107 provides a presentation UI and multi-layer presentation data to the user terminal 101.

The presentation UI 107*c* may allow the user to take notes and make annotations, for example, on the touch-sensitive display of the terminal 101. The display of the terminal 101, for example, displays the presentation file (e.g. PowerPoint slides) and overlay annotations are made directly on the display.

The presentation UI 107*c* may also allow the participant to specify who (or what) access the overlay data representing the annotations made by the participant. For example, the presenter UI 107*c* may display several access options (i.e. levels of access, including, for example, private, public, presenter only, same department only, etc.) to the user and ask the user to select one of the access options. Alternatively, the presenter UI 107*c* may allow the user to select from a list of all participants of the meeting (e.g. "select who may access your overlay annotations").

In addition, the presentation UI 107*c* may allow the user to add an active link to a content source to the overlay data. For example, the presentation UI 107*c* may include a button for adding an active link, and by activating the button, the user is allowed to submit an active link pointing to other content. The submitted link is then added to the overlay data.

Figure 5:
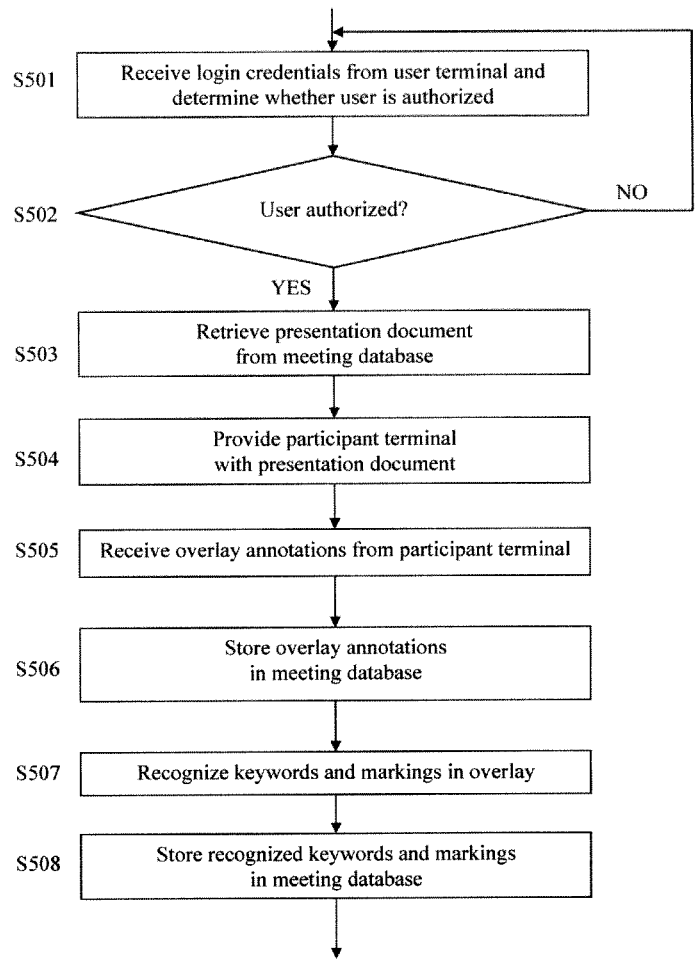
FIG. 5 shows a flowchart for a method of managing conference data, according to an exemplary embodiment.

The operation of the conference data management apparatus 103 is further described infra in connection with the example of FIG. 5. The steps described above as being performed by the conference data management apparatus 103 (e.g. keyword extraction) are not limited to being performed on such apparatus connected to user terminals via the network 106, and all or part of such steps described above may be performed at terminal-side, e.g., at the terminals 101 and 102.

The database 104 includes meeting data corresponding to a plurality of meetings. The meeting data for each meeting may include one or more presentation documents presented at the meeting, a set of overlay data created and/or edited by a plurality of participants of the meeting, and a set of keyword data associating the keywords extracted from the overlay data with the meeting. Although only one set of meeting data (i.e. meeting #1 104*a*) is shown in FIG. 1A, it should be understood that the database 104 may include plural sets of meeting data corresponding to plural meetings whose data is managed by the conference data management apparatus 103.

In an exemplary embodiment, the database 104 may be an Intranet folder, locally connected to the other devices of the system 100 via the network 106. In another exemplary embodiment, the database 104 may be connected to the conference data management apparatus 103 via the Internet.

The content sources 105 can provide various contents, and includes specific contents of interest to the user as annotated by the user in the overlay. As a result of the user annotation, the overlay may include links or pointers to the specific content or content sources of interest. The content sources 105 may be a local storage or a storage connected via a network (e.g. the Internet), or a combination of both.

The network 106 can be a local area network, a wide area network or any type of network such as an intranet, an extranet (for example, to provide controlled access to external users, for example through the Internet), the Internet (e.g. a cloud network provided over the Internet), etc., or a combination thereof. Further, other communications links (such as a virtual private network, a wireless link, etc.) may be used as well for the network 106. In addition, the network 106 preferably uses TCP/IP (Transmission Control Protocol/Internet Protocol), but other protocols can also be used. How devices can connect to and communicate over the network 106 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

With reference to FIG. 1B, a system 110 according to another exemplary embodiment is described below.

The system 110 includes a participant terminal 111, a conference data management apparatus 113, a database 114 and content sources 115, communicating via a network 116.

The UI providing unit 113c of the conference data management apparatus 113 provides to the participant terminal 111 (i) presentation data and (ii) presentation UI, which includes an annotation part, an access control part, and a link adding part.

The annotation part allows the user to take notes and make annotations, for example, on the touch-sensitive display of the participant terminal 111. The display of the terminal 111, for example, displays the presentation file (e.g. PowerPoint slides) and overlay annotations are made directly on the display.

The access control part allows the participant to specify access for the overlay data provided by him or her. For example, the presentation UI may display several access options (i.e. levels of access, including, for example, private, public, presenter only, same department only, etc.) to the user and ask the user to select one of the access options. Alternatively, the presentation UI may allow the user to select from a list of all participants of the meeting (e.g. "select who may access your overlay annotations").

The link adding part allows the user to add an active link to a content source to the overlay data. For example, the presentation UI may include a button for adding an active link, and by activating the button, the user is allowed to submit an active link pointing to other content. The submitted link is then added to the overlay data.

As illustrated in FIG. 1B, the participant terminal 111 provides a participation request, overlay annotations, access information and active links to the conference data management apparatus 113 via the network 116.

Otherwise, the operations of the system 110 are similar to those described in connection with the system 100 of FIG. 1A.

Figure 1C:
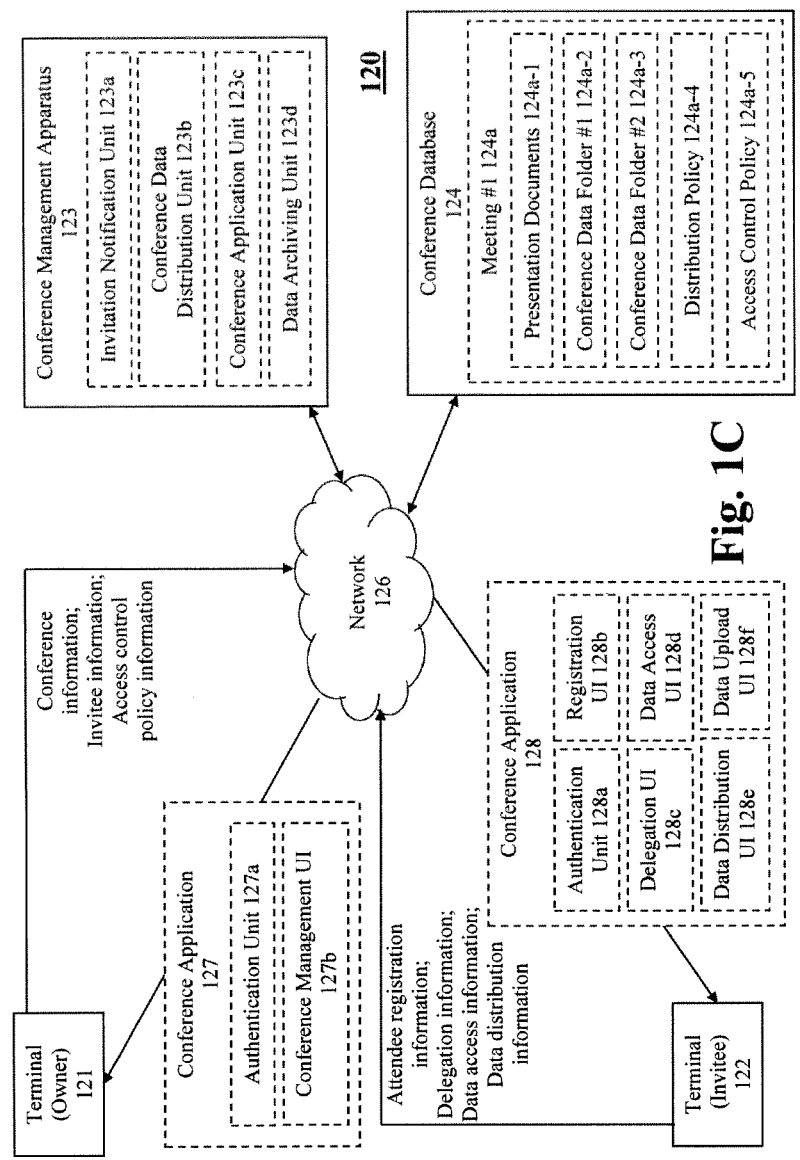
FIG. 1C shows a block diagram of a system, according to another exemplary embodiment.

With reference to FIG. 1C, a system 120 according to another exemplary embodiment is described below.

The system 120 includes terminals 121 and 122, a conference management apparatus 123, a database 124, conference applications 127 and 128, all of which are interconnected by a network 126.

The conference management apparatus 123 includes an invitation notification unit 123a, a conference data distribution unit 123b, a conference application unit 123c and a data archiving unit 123d.

The invitation notification unit 123a of the conference management apparatus 123 causes an electronic notification to be transmitted to invitees (e.g. specified by an administrator or organizer of the conference) to invite the invitees to the conference/meeting and request the invitees to respond to the invitation. For example, an invitation may be sent to the e-mail address of the invitee, and the invitee may be requested to reply via return e-mail. Similarly, a text messaging service or a mobile application may also be used.

The conference data distribution unit 123b of the conference management apparatus 123 distributes conference data, such as presentation slides and supplemental materials related to the conference, to each of the invitees invited to the conference.

In doing so, certain policies may be adopted to automatically control how access to the conference data maintained in the database (which can simply be a collection of data or a data management system involving various programs on top of the collection of data to enable various functionalities such as document registration, search, etc.) is granted and how the conference data is distributed. Such policies are automatic rules for deciding which participants should be granted what kind of access and how data stored in the conference database should be distributed to which participants. Under an exemplary distribution policy, the conference data distribution unit 123b may add to the conference database 124, for each invitee, a conference data folder which is accessible only by the invitee and insert the conference data to each of the conference data folders. Under an exemplary access control policy, a person may be able to access the conference data only after the person registers for the meeting in response to the invitation (e.g. such invitee may wish to preview the conference materials before attending the conference). However, if the person does not respond to the invitation and fails to register for the meeting, the person may be denied such access to the conference data. If the invitee registers for the meeting and actually attends the meeting, he or she may be granted access to even more resources in connection with the meeting (e.g. data useful for conducting post-meeting discussions), than if he or she merely registered for the meeting but failed to attend the meeting.

In another scenario, an invitee may be not be able to personally attend the meeting, but may wish to appoint a delegate to attend the meeting in his or her place. In such a case, for example, once the delegate registers for the meeting, both the original invitee and the delegate may be granted access to the conference data. Delegation is further described infra in connection with the conference application 128 of FIG. 1C.

The policies and access control rules are automatically applied without a person (e.g. an administrator or coordinator of the meeting) having to individually grant access to each participant. Such policies are not limited to those discussed herein and can include any rule that would differentiate the participants depending on their actions and statuses [e.g. based on whether they register or attend and based on their positions (executive vs. junior associate, professor vs. student, VIP vs. regular customer, etc.)]. For example, in an informational meeting at a university, faculty members of the university may be granted access to the conference data regardless of whether he or she registers or attends the meeting whereas students and other guests may have to register or attend the meeting before they can access the conference data.

In addition to such policies automatically setting access rights, access to conference data can further be configured manually, for example, by an administrator who oversees and controls various aspects of the meeting. For example, if the administrator of the meeting wishes to modify the access automatically granted to a particular participant under a distribution policy, he or she may be allowed to do so.

The conference application unit 123c of the conference management apparatus 123 provides a conference application (e.g. conference applications 127 and 128 shown in FIG. 1C) through the network 126, allowing the conference organizers and invited guests to utilize the services provided by the conference management apparatus 123. The conference applications 127 and 127 are described Infra in greater detail.

The data archiving unit 123d of the conference management apparatus 123 archives the conference data and backs up changes made to the data stored in the conference database 124.

For example, the data archiving unit 123d takes a version of the conference data at the time at which the conference is scheduled to begin, and stores the version of the conference data in the conference database 124 as pre-meeting data. Such pre-meeting data may be prohibited from being modified in order to ensure that all the participants are in agreement with regard to what is referred to as the conference data both during the conference and after the conference (for post-meeting discussion, etc.).

In addition to archiving such pre-meeting data at the scheduled time of the conference, the data archiving unit 123d can also periodically archive the data in the conference database for backup purposes to ensure every change to the conference data is saved.

The conference database 124 stores data associated with the conference, including presentation slides, supplemental documents, participant-generated work product, other brochures and pamphlets related to the conference. The conference database 124 may also include conference information, invitee information, access control policy information and any other information needed for operation of the conference management apparatus 123.

Often when there is a meeting, participants may wish to have access to meeting materials prior to the date of the meeting to review the meeting materials, before showing up at the meeting, to come up with questions and comments and further research the topic and find other supplemental materials to bring to the meeting.

Normally, when distributing files stored on a server side storage to other recipients over a network, links to such files are provided to the recipients who are to be granted access to such files. Alternatively, files are transmitted to intended recipients so that such recipients can save a copy, for example, on their computers to review and possibly mark up the materials contained in the files. Such approaches can save storage space on the server side.

However, in an exemplary embodiment of the present application, rather than just sending links to the conference data stored on the server side storage to each invitee (or anyone who is permitted to access such conference data) to allow the invitee to access the conference data stored on the server side storage, a folder is created for each invitee, and a copy of the conference data is inserted in each folder. Thus, if N people are invited to a meeting, N folders would be created (e.g. conference data folders #1 and #2 shown in FIG. 1C) and N copies of the conference data would be made, if each invitee is to be given access to the conference data.

The attendees, each of them having his or her own folder, can not only review the conference data provided to them before (and also during and after) the date of the meeting, but also start adding comments to the conference data and even share such comments with other potential participants of the meeting.

For example, the participants may discuss with other participants various issues that might be covered at the conference before and after the conference. Such discussion is facilitated by the ability for the participants to be able to share the annotations and revisions of the conference data made by the presenter (or anyone else having control over the conference) or other participants of the conference. For example, an esteemed commentator may annotate his or her electronic copy of the conference presentation slides in his or her folder and make such annotation available to other attendees of the conference, and even allow them to provide feedback in return. He or she may also write and upload an article defending a position contrary to a presenter and solicit comments in the form of participant comments. Further, if a presenter decides to revise parts of the conference materials, the revised version of the conference data may be stored separately from the original version and distributed to those participants who had access to the original version of the conference data. By keeping separate versions of various revisions, everyone can be sure that everyone is looking at the same data when they say, for example, "version 2.1" of the conference data.

Thus, the conference data folders created for the invitees are not merely local folders which would be difficult to share with other participants of the conference. All the data stored in the conference database is centralized such that everyone can access everyone else's folders as long as they have permission to do so.

Each participant may configure the access to the participant's folder granted to other participants. In other words, a participant has control over any work product generated by the participant (e.g. able to control who may access such work product).

Such sharing of comments and discussion among the participants of the meeting may improve the quality of the actual meeting when it takes place on the scheduled date and even prompt the organizer of the meeting (e.g. the presenter) to revise the conference data. How such additions and revisions are shared among the participants of the conference is further described infra in connection with the conference application 128 of FIG. 1C.

Referring back to FIG. 1C, the conference database 124 is connected to the conference management apparatus 123 via the network 126. The conference database 124 may include one of various types of networks such as an intranet, a cloud network, or a combination thereof, as discussed supra in connection with FIG. 1A).

As discussed above, the conference database 124 may simply be a collection of data or a database management system involving various programs on top of the collection of data to enable various functionalities such as document registration, search, etc.

As shown in FIG. 1C, the conference database 124 may include presentation documents 124a-1, numerous conference data folders 124a-2 and 124a-3, a distribution policy 124a-4 and an access control policy 124a-5 for each meeting (e.g. meeting #1 124a).

Each of the conference data folders 124a-2 and 124a-3 are maintained for a specific invitee of the conference and includes copies of the conference data including presentation slides and other supplemental materials related to the conference. The copies of the conference data may be modified by the invitee and shared with other invitees or participants of the conference, as described infra in greater detail with reference to the conference application 128 of FIG. 1C.

The distribution policy 124a-4 specifies how the conference data for the meeting #1 124a should be distributed to the participants of the conference. Similarly, the access control policy 124a-5 specifies how access to the conference data is granted to the participants of the conference. How such policies may be set or modified is further described infra in connection with the conference application 127.

In the event that no such distribution policy is set by the organizer of the conference, data distribution is carried out according to a default distribution policy. Similarly, in the event that no such access control policy 124*a*-5 is set by the organizer of the conference, access control is carried out according to a default access control policy.

Although the distribution policy 124*a*-4 and the access control policy 124*a*-5 are depicted as being specific to the meeting #1 124*a*, the conference database 124 may also include global distribution and access control policies which are, for example, set by the administrator of the conference database 124 who oversees all the meetings and conferences that utilize the conference management system of FIG. 1C.

Any time before, during or after the conference, participants may add files to their conference data folder (e.g. via data upload UI 128*f* discussed infra) to be used in connection with discussions and shared with other participants of the conference. To facilitate such peer-to-peer interactions, a file-naming convention may be adopted to govern how all the files (e.g. various revisions and other documents) in the conference database should be named. For example, a file-naming convention may state that each file should have the following format: "DocumentName.Date.AuthorName". In an exemplary embodiment, the conference management system automatically renames the file using the available information. For example, the author name can be derived from the identity of the person who is adding the file, and the date can be derived from the date on which the file is added to the conference database. In addition, metadata can be used to keep track of the information such as author name and date, which are not normally displayed when the content of the file is viewed.

In another exemplary embodiment, every change to the data stored in the conference database is backed up. Thus, for example, when an a participant of the conference is annotating a copy of the conference slides or revising a document stored in the conference data folder, the file that is being modified is constantly being backed up. The changes to the data stored in the conference database may be stored in an index table for efficient retrieval and analysis.

In addition, participants can suggest certain changes (e.g. revising the conference materials in a certain way) to the presenter or administrator who has control over the meeting. The suggested changes may be adopted by the presenter or administrator, and copes of the conference data incorporating the changes may be distributed to the participants of the conference.

A conference does not merely constitute a single moment in time but may include an ever-accumulating pool of data, and new information may be constantly added to the database. However, different events lock certain versions of the conference data and render such versions of the conference data unmodifiable so that everyone can be on the same page when referring to such versions of the conference data. For example, as discussed above, at the scheduled time of the conference, the current version of the conference data (e.g. presentation slides and supplemental materials) is archived in the conference database as pre-meeting data, and such pre-meeting data is prohibited from any change thereto.

In another exemplary embodiment, sub-folders may be created for different agenda items of the meeting. For example, if the presenter is going to discuss 12 topics during the conference, each topic may have its own folder. Such structure makes it easier to check which topic received the most comments from the participants, etc. when participant comments and annotations are analyzed before, during and after the conference.

As discussed above, the conference application unit 123*c* of the conference management apparatus 123 provides a user (e.g. an organizer or an invitee of the conference) at a terminal (e.g. terminals 121 and 122) with a conference application which allows the user to utilize the services provided by the conference management apparatus 123.

As shown in FIG. 1C, the conference application 127 includes an authentication unit 127*a* for authenticating user requests (e.g. adding new invitees or setting the distribution policy for distributing the conference data) from the terminal 121, and a conference management UI 127*b* for allowing, upon successful authentication of the request, the user at the terminal 121 to communicate certain commands to the conference management apparatus 123. For example, the user may wish to create a new conference, add invitees to an existing conference, or modify a particular invitee's access to the conference data. The conference management UI 127*b* transmits such requests to the conference management apparatus via the network 126.

For example, the authentication unit 127*a* may authenticate such requests using login credentials of the user submitting the request provided along with the requests, and may use other methods discussed supra in connection with the participant authentication part 107*b* of FIG. 1A.

The conference application 127 allows a user (e.g. organizer of the conference) to enter conference information, which includes details regarding the conference, via the conference management UI 127*b* provided by the conference application unit 123*c* of the conference management apparatus 123. Also, distribution policies (which determine how the conference data should be distributed) can be set (or modified) by, for example, an administrator who oversees and controls the conference, via the conference management UI 127*b*. In the event that no distribution policy has been set by anyone via the conference management UI 127*b*, a default policy may govern the distribution of the conference data. For example, the default policy may dictate that if an invitee indicates, in response to the electronic notification (i.e. invitation), that he or she will not attend the conference, the conference data distribution unit 123*b* insert a link to the conference data in the conference data folder for the non-attending invitee, allowing the non-attending invitee to access the conference data. Another policy may dictate that if no response is received from an invitee (i.e. unresponsive invitee), such unresponsive invitee is not permitted access to the conference data folder or no conference data is inserted to the conference data folder created for the invitee.

The conference application 128, which is provided to the terminal 122 by the conference application unit 123*c* of the conference management apparatus 123, includes an authentication unit 128*a*, a registration UI 128*b*, a delegation UI 128*c*, a data access UI 128*d*, a data distribution UI 128*e* and a data upload UI 128*f*.

The authentication unit 128*a* authenticates a request received through the network 126 from the invitee at the terminal 122 to participate in the conference/meeting. Upon successful authentication of the request, the user may be allowed to perform a variety of tasks via any of the registration UI 128*b*, the delegation UI 128*c*, the data access UI 128*d*, the data distribution UI 128*e* and the data upload UI 128*f*.

The registration UI 128*b* allows the invitee to register for the conference (i.e. indicate that he or she will be attending the conference) as a registrant. In an exemplary embodiment, invitees are granted access to the conference data only after the invitee registers for the conference in response to the invitation sent to the invitee.

The delegation UI 128c allows the invitee who will not be attending the conference to delegate participation in the conference to a delegate in place of the invitee. The invitee may provide via the delegation UI 128c a delegate notification address to which an electronic invitation for the delegate may be sent.

When a delegation request is received via the delegation unit 128c, the conference data distribution unit 123b adds to the conference database a delegated participant folder for access only by the delegate and inserts a copy of the conference data in the delegate participant folder for the delegate.

Alternatively, the delegate may be requested to register for the meeting before such a delegated participant folder is created in the conference database 124. For example, once the delegation request is received along with a delegate notification address, an electronic notification may be transmitted to the delegate notification address to register for the meeting. Upon the delegate registering for the meeting in place of the non-attending invitee, the conference data distribution unit 123b may add a delegated participant folder to the conference database and insert a copy of the conference data in the delegated participant folder for the delegate.

In addition, when the delegate registers for the meeting, a copy of the conference data may be inserted to the folder maintained in the database for the non-attending invitee (e.g. as if the non-attending invitee registered for the conference/meeting).

The data access UI 128d allows the invitee who has registered for the conference as registrant to set or modify a folder access policy which governs access by others to the conference data folder maintained in the conference database 124 for the registrant.

For example, the registrant may wish to keep the content of his or her conference data folder hidden from other registrants/participants of the conference. In such a case, the registrant may, via the data access UI 128d, specify a folder access policy that would not permit other participants to view the registrant's conference data folder.

On the other hand, if the registrant wishes the content of his or her conference data folder to be freely accessible by other participants of the conference, the registrant may specify a folder access policy that would achieve such objective.

The data distribution UI 128e allows the invitee who has registered for the conference as registrant to specify data to be distributed to other registrants.

For example, the registrant may wish to share with other participants of the conference some comments that he or she has generated in response to conference materials. In such a case, the registrant may, via the data distribution UI 128e, request that the comments (e.g. stored in the conference data folder maintained for the registrant in the conference database 124) be distributed to other participants specified by the registrant (e.g. all other participants, organizers, or invitees who will be attending the conference).

The data upload UI 128f allows the invitee who has been assigned a conference data folder in the conference database 124 to upload data to the conference data folder to be shared with other participants of the conference. Such data may include any work product generated by the invitee or any supplemental materials relevant to the conference.

The conference applications 127 and 128 are not limited to the configurations discussed herein and may further include a variety of other components to better connect the users to the services provided by the conference management apparatus 123.

Further, the method of utilizing the services provided by the conference management system of the present application is not limited to the use of the aforementioned conference applications. For example, the conference data may be accessed and various commands can be communicated to the conference management system via e-mail.

Figure 1D:
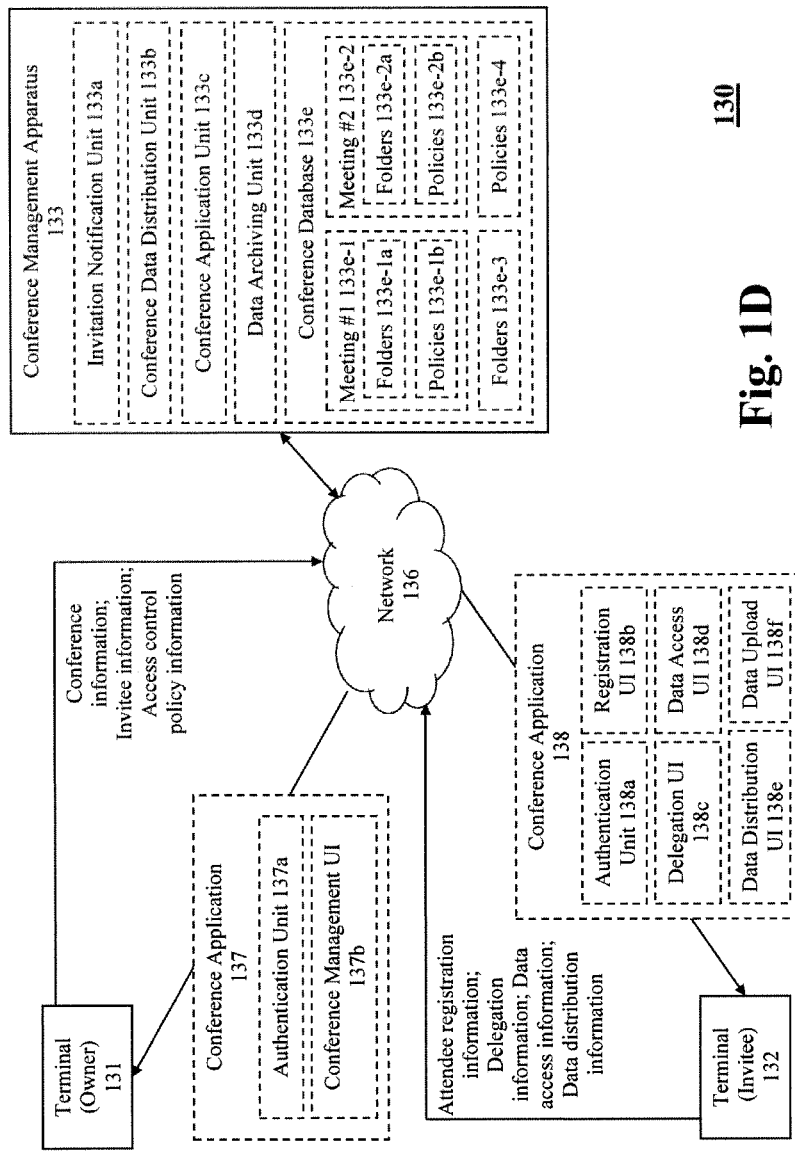
FIG. 1D shows a block diagram of a system, according to another exemplary embodiment.

With reference to FIG. 1D, a system 130 according to another exemplary embodiment is described below.

The system 130 includes terminals 131 and 132, a conference management apparatus 133, conference applications 137 and 138, all of which are interconnected by a network 136.

The difference between the system 130 and the system 120 of FIG. 1C is that in the system 130, the conference database is integrated into the conference management apparatus 133. That is, the conference management system 133 includes a conference database 133e, which includes meeting #1 133e-1, meeting #2 133e-2, folders 133e-3 and policies 133e-4. The folders 133e-3 and policies 133e-4 are not specific to any meeting or conference and may include data such as template settings for new conference data, database information of the conference database 133e and default settings and policies for meetings and conferences conducted via the conference management apparatus 133.

Each of the meetings #1 and #2 may further include folders (133e-1a and 133e-2a) and policies (133e-1b and 133e-2b) specific to the meeting.

Otherwise, the operations of the system 130 are similar to those described in connection with the system 120 of FIG. 1C.

It should be appreciated that FIGS. 1A-1D merely illustrate exemplary embodiments of a system according to the present disclosure and that the processing in the system according to the present disclosure can be distributed across the network or focused at one side of the network, as circumstances or need warrants. For example, although each of the overlay engine unit 103a, keyword extraction unit 1036 and participant application unit 103c is shown in FIG. 1A as being integrated in the conference data management apparatus 103, the participant application unit 103c may be separately provided, such as, for example, as an application server to provide the meeting participation application. As another example, although the meeting participation application can be provided largely as a user interface, said application can optionally include processing portions (such as, for example, keyword extraction) as well.

Figure 2A:
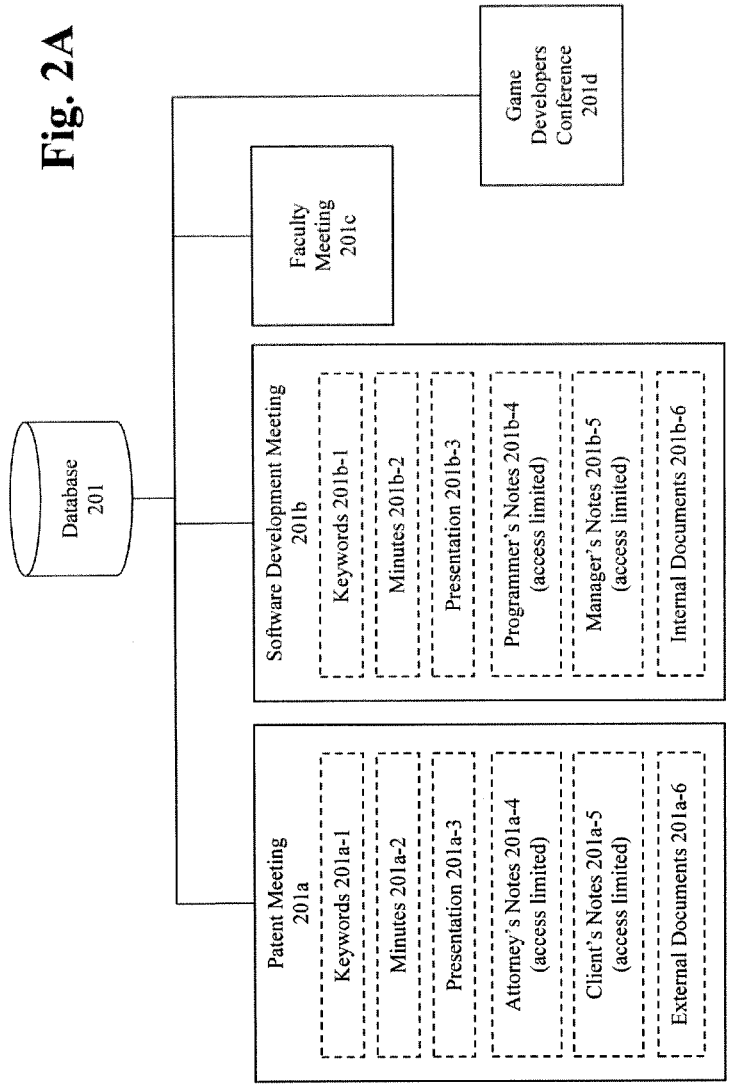
FIG. 2A shows a configuration of a meeting database, according to an exemplary embodiment.

With reference to FIG. 2A, a database 201 which can be a meeting database or a structure encompassing all or a portion of a meeting database, according to another exemplary embodiment, is described below. FIG. 2A shows a block diagram illustrating contents of the database 201. In the example of FIG. 2A, the database 201 includes a patent meeting 201a, a software development meeting 201b, a faculty meeting 201c and a game developers conference 201d.

The patent meeting 201a includes keywords 201a-1, minutes 201a-2, a presentation 201a-3, attorney's notes 201a-4, client's notes 201a-5 and external documents 201b-6. The keywords 201a-1 may be keywords extracted from overlay annotations provided to the conference data management apparatus 103 of FIG. 1A.

The attorney's notes 201a-4 and client's notes 201a-5 are examples of overlay annotations made by various participants of the patent meeting 201a. As indicated in FIG. 2A, access to the attorney's notes 201a-4 and client's notes 201a-5 may be limited or controlled (such as by the conference data management apparatus 103 or by an access control part, not shown, of the database, or by another part), the extent of access configurable by the attorney and the client, respectively.

The external documents 201b-6 may be, for example, PDF files of references cited in an Office Action. Rather than including the entire references in the presentation file, the presenter may have simply added active links pointing to such references, and the conference data management apparatus 113 of FIG. 1B, for example, has archived the external content from the content source identified by the active links. Similarly, in the software development meeting, a programmer may have included links to numerous code files stored in the company network, and such code files are archived as internal documents 201b-6.

Although not shown in FIG. 2A, the faculty meeting 201c and game developers conference 201d may have similar structures as discussed above.

With reference to FIG. 2B, a database 211 which can be a conference database or a structure encompassing all or a portion of a conference database, according to another exemplary embodiment, is described below. FIG. 2B shows a block diagram illustrating contents of the database 211. In the example of FIG. 2A, the database 211 includes a patent meeting 211a, a software development meeting 211b, a faculty meeting 211c, a game developers conference 211d and global data 211e.

As shown in FIG. 2B, the patent meeting 211a includes conference data 211a-1, distribution policies 211a-2, access control policies 211a-3 and participant folders 211a-4, 211a-5 and 211a-6.

The conference data 211a-1 may include presentation slides, supplemental materials to be distributed at the conference, and other resources related to the topics covered at the conference. As discussed above, a copy of the conference data 211a-1 is inserted to each of the participant folders to allow the participants of the conference to access the conference data 211a-1.

As discussed supra in connection with FIG. 1C, the distribution policies 211a-2 include rules for deciding how the data stored in the database 211 should be distributed to which participants, and the access control policies 211a-3 include rules for deciding which participants should be granted what kind of access. Such policies may be set or modified by the organizer of the conference (i.e. the patent meeting 211a) or, in the absence of such policies set by the organizer, default rules that are created by, for example, an administrator who oversees the conference management system.

The participant folder 211a-6 includes conference data (copy) 211a-6a, uploads 211a-6b and downloads 211a-6c.

The conference data (copy) 211a-6a is, as it says, a copy of the conference data 211a-1 shown in FIG. 2B. In an exemplary embodiment, a copy of the conference data 211a-1 is inserted to each of the participant folders created for the participants of the conference, to allow the participants to access and modify the conference data.

The uploads 211a-6b include data uploaded to the participant folder 211a-6 by the owner (i.e. participant for whom the folder is being maintained in the database 211) of the participant folder 211a-6. Such data uploaded to the participant folder 211a-6 may be shared with other participants of the conference by, for example, giving the other participants access to the data and distributing the data via the data access UI 128d and data distribution UI 128e of the conference application 128 of FIG. 1C.

The downloads 211a-6c include data downloaded from other participants' folders. The downloaded data may include work product generated by other participants and other resources stored in the database 211. Such data may be further annotated or modified by the downloading participant for further sharing and distribution.

Although not shown in FIG. 2B, the participant folders 211a-4 and 211a-5 may have a similar structure as the participant folder 211a-6.

The global data 211e includes any data that applies generally to all the meetings and conferences managed by the conference management system, such as template settings for new conference data, database information of the database 211 and default settings and policies for meetings and conferences conducted using the database 211.

Figure 3:
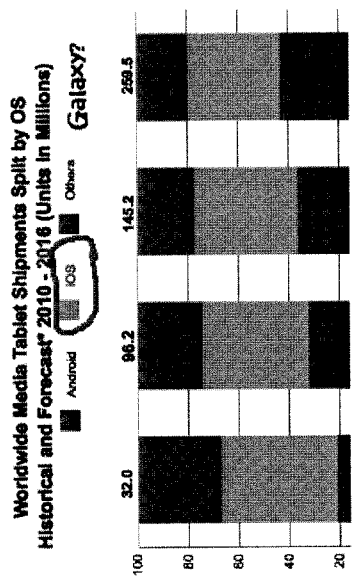
FIG. 3 shows sample overlay annotations on a presentation document in an exemplary embodiment.

An example of a presentation document with overlay annotations displayed to a participant of a conference is shown in FIG. 3. In the example of FIG. 3, the participant (e.g. attendee or presenter) has underlined the words "Cheap Kindle Fire", circled "iOS" in the legend, and written "Galaxy?" next to the legend. For example, if the particular terminal device used by the participant is equipped with a touch-sensitive display, the underlining and circling of words or phrases may be done by hand (i.e. using fingers) or done using any type of computer accessories (e.g. a stylus) designed to assist with touch-sensitive displays. The meeting participation application provided to the terminal device may include a set of tools for facilitating the user annotation process. For example, the participant may tap a word in the presentation file to highlight or underline the word, and double tap a location on the screen to be able to type comments at the location. Alternatively, other input devices (e.g. a computer mouse) may be used to highlight, underline, circle or otherwise add graphical overlay annotations to the presentation file. The participant may also add comments directly on the touch-sensitive display, for example, by hand or using a computer accessory such as a stylus, or type them out using a keyboard (including a graphical keyboard that may be displayed on the touch-sensitive display). The participant may even talk into a microphone attached to the terminal device to add a voice note to the presentation file.

The input method used to create and add overlay annotations to the presentation document is not limited to the methods discussed supra, and may include other equivalent methods of inputting data into a terminal device.

Figure 4:
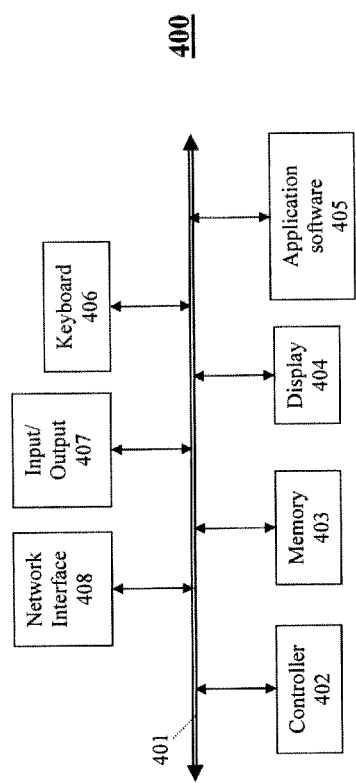
FIG. 4 shows a block diagram of a user terminal, according to an exemplary embodiment.

An example of a configuration of the terminals 101 and 102 of FIG. 1A (or terminals 121 and 122 of FIG. 1C) is shown schematically in FIG. 4. In FIG. 4, terminal device 400 includes a controller (or central processing unit) 402 that communicates with a number of other components, including memory 403, display 404, application software 405, keyboard (and/or keypad) 406, other input/output (such as mouse, touchpad, stylus, microphone and/or speaker with voice/speech interface and/or recognition software, etc.) 407 and network interface 408, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 408 provides a means for connecting (for example, by way of an Ethernet connection or other network connection which supports any desired network protocol such as, but not limited to TCP/IP, IPX, IPX/SPX, or NetBEUI) to network 401.

Application software 405 is shown as a component connected to the internal bus 401, but in practice is typically stored in storage media such as a hard disk or portable media, and/or received through the network 105, and loaded into memory 403 as the need arises.

Depending on the type of the particular terminal device, one or more of the components shown in FIG. 4 may be missing or connected externally. For example, a particular mobile device may be missing the keyboard 406, but another keyboard may be connected to the mobile device externally. Similarly, a particular desktop computer may, for example, have an external microphone connected thereto.

Additional aspects or components of the terminal device 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Defiler, Jr. and Les Freed (Que Corporation 2000), the entire contents of each of which are incorporated herein by reference.

With reference to FIG. 5, a method for managing conference data through a network (utilized by, for example, the conference data management apparatus 103 of FIG. 1A) is described below.

In the example shown in FIG. 5, the participant authentication part 103b of the conference data management apparatus 103 receives login credentials from the user terminal 101 and uses the login credentials to authenticate the user request to join a specific conference (step S501). Although not shown in FIG. 5, the user may be required to first register for the specific conference. For example, the registration may take place in advance before the scheduled date/time of the conference (e.g. providing registration information for an upcoming conference, and then at the conference, logging in via the meeting participation application provided by the conference data management system to be authenticated as a registered participant). Alternatively, the conference data management may maintain an independent list of authorized participants who may participate in the conference, and authenticate users who submit a request to participate in the conference, based on the list of authorized participants.

Once the user request to join the conference is authenticated (S502, YES), the conference data management apparatus 103 retrieves a presentation document for the specific conference from the meeting database 104 (step S503). The presentation document can include PowerPoint presentation slides or any other documents or image data. This can be achieved, for example, by looking up the specific conference (e.g. by using a unique ID assigned to the specific conference) in a table associating each conference with one or more presentation files used for the conference.

The conference data management apparatus 103 provides the user terminal 101 with the retrieved presentation document (step S504). For example, in a case that the user terminal 101 is a tablet PC, the user can simply open the presentation file provided by the conference data management apparatus 103 and scroll through the pages of the presentation file on the tablet PC, and take notes and make annotations directly on the touch-sensitive display of the tablet PC.

Once the user makes overlay annotations on the presentation document, the conference data management apparatus 103 receives overlay data containing the overlay annotations made by the user from the user terminal 101 (step S505) and stores the received overlay annotations in association with the presentation file in the database 104 (step S506). For example, the overlay data (e.g. a PDF file including all the annotations made by the user) and the corresponding presentation file are tracked in amble such as shown in FIG. 9 ("overlay data information").

Then, the keyword extraction part 103b of the conference data management apparatus 103 recognizes one or more keywords from the received overlay data (step S507). The keyword recognition process is further described infra with reference to FIG. 13.

The recognized keywords are stored in the database 104 in association with the specific conference of which the user was a participant and for which the user made notes and/or annotations. For example, each conference for which there are one or more sets of overlay data containing keywords is tagged with such keywords found in the overlay data for the conference. As shown in FIG. 9 ("keyword information"), each conference (here, identified by a unique meeting ID) has a plurality of keywords which potentially describe the content of the conference (e.g. what the participants thought was important or interesting). Thus, each conference is tagged with keywords that identify what its participants thought were important or worth noting.

Figure 6:
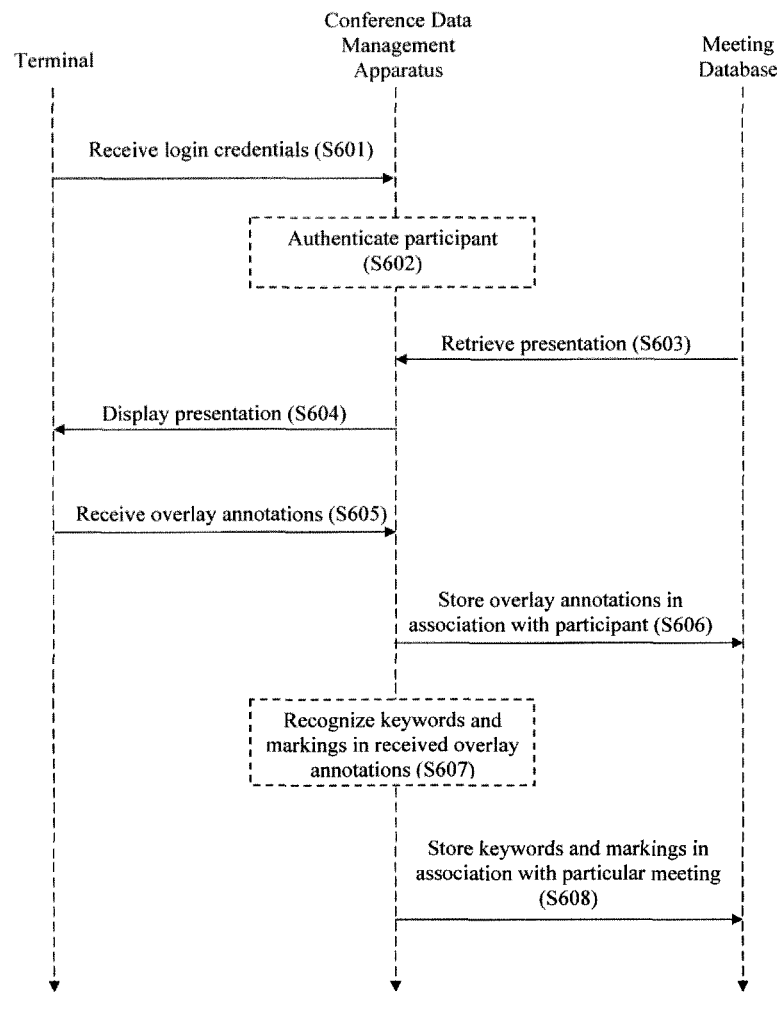
FIG. 6 shows a dataflow in a conference data management system, according to an exemplary embodiment.

FIG. 6 shows a dataflow corresponding to the steps illustrated in FIG. 5, according to an exemplary embodiment. For the sake of simplicity, the steps are described as they are performed by the conference data management apparatus 103.

In the example of FIG. 6, the conference data management apparatus 103 receives the login credentials from the user terminal 101 (step S601). Upon successfully authenticating the user as an authorized participant of the conference that the user requested to join (step S602), the conference data management apparatus 103 retrieves the presentation file associated with the specific conference from the meeting database (step S603) and displays the presentation file to the user terminal 101 (step S604). The user then makes overlay annotations on the presentation file, and the conference data management apparatus 103 receives overlay data containing such overlay annotations from the user terminal 101 and stores the overlay data in association with the user and the specific conference in the meeting database (step S606). Then, the conference data management apparatus 103 recognizes (e.g. in the manner described with reference to FIG. 13) keywords in the received overlay data (step S607) and stores the recognized keywords in association with the specific conference in the meeting database (step S608).

Figure 7:
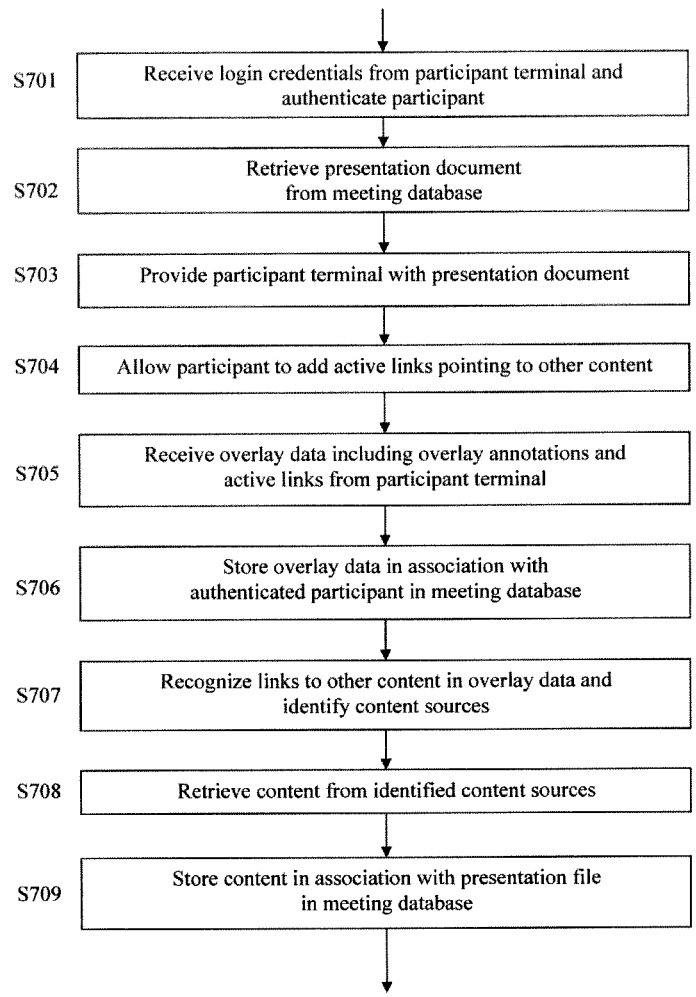
FIG. 7 shows a flowchart for a method of managing conference data, according to an exemplary embodiment.

With reference to FIG. 7, another method for managing conference data through a network (utilized by, for example, the conference data management apparatus 113 of FIG. 1B) is described below.

In the example shown in FIG. 7, steps S701-703 are similar to the steps s501-s504 described in connection with the example of FIG. 5. In step S704, the conference data management apparatus 113 allows the participant at the terminal 111 to add active links pointing to other content to the overlay data (i.e. along with annotations). The conference data management apparatus 113 then receives the overlay data including the participant's annotations and any added active links from the terminal 111 (step S705) and stores the received overlay data in association with the participant in the meeting database (step S706). The conference data management apparatus 113 then recognizes the active links added to the overlay data by the participant and identifies content sources from which the other content to which the active links point can be retrieved (step S707). For example, the content sources may include a web storage accessible via the Internet or a network storage accessible via a local network.

Once the content sources have been identified, the conference data management apparatus 113 retrieves said other contents from the identified content sources (step S708) and stores the retrieved content in association with the presentation file in the meeting database. Thus, according to the method shown in FIG. 7, linked content (i.e. external to the presentation file itself) is made locally available such that such content can be accessed at a later time without having to worry about whether the content external to the presentation file still exists at the time of viewing the presentation file.

The conference data management apparatus 113 may also retrieve and store contents linked by the author of the presentation, and not just those linked by the author of the overlay data.

Figure 8:
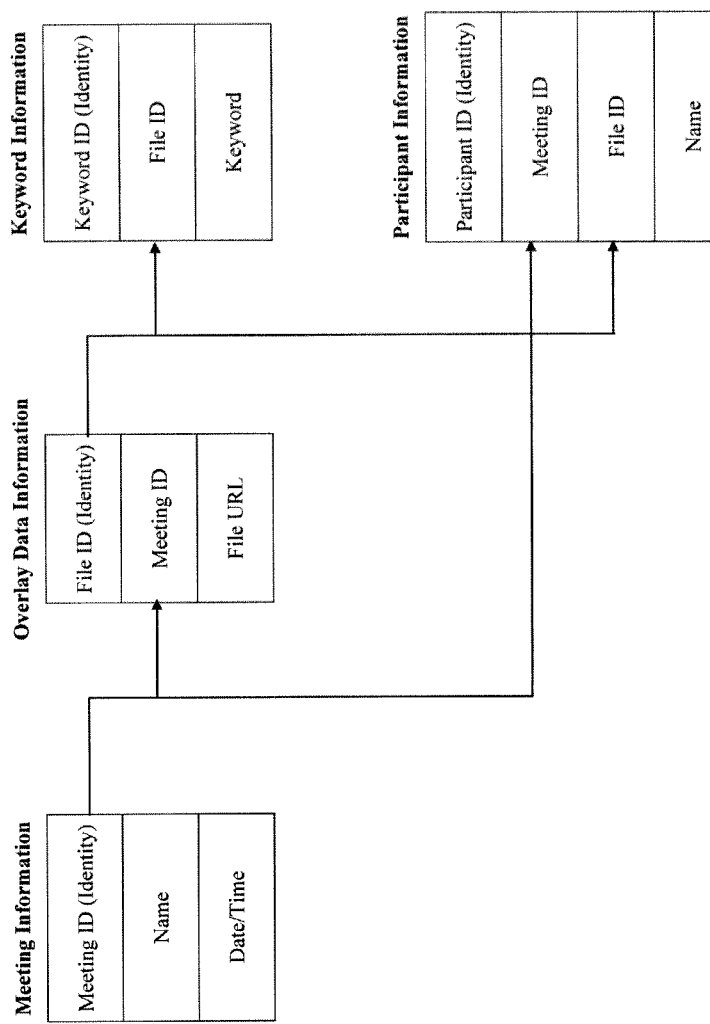
FIG. 8 shows a sample structure of tables stored in a meeting database in an exemplary embodiment.

FIG. 8 shows a sample structure of tables stored in a meeting database in an exemplary embodiment. FIG. 9 shows tables stored in the meeting database in an exemplary embodiment, tables corresponding to the structure shown in FIG. 8.

In the examples of FIGS. 8 and 9, meeting information, overlay data information, keyword information and participant information are shown.

The meeting information keeps track of, for each meeting, (i) a meeting ID uniquely assigned to each meeting, (ii) the name of the meeting, and (ii) the date and time of the meeting.

The overlay data information keeps track of, for each overlay data, (i) a file ID uniquely assigned to each overlay data, (ii) the meeting ID associated with the overlay data, and (iii) the file URL where the overlay data is stored (e.g. in the meeting database 104).

The participant information keeps track of, for each participant, (i) a participant ID uniquely assigned to each participant, (ii) the meeting ID of the meeting in which the participant is participating and (iii) the name of the participant.

The keyword information keeps track of, for each keyword extracted from one or more sets of overlay data, (i) a keyword ID uniquely assigned to each keyword, (ii) the meeting ID of the meeting with which the keyword is to be associated and (iii) the keyword itself.

As another example of what may be stored in the meeting database (e.g. the database 104). FIG. 10 shows overlay data and author information, which associates each overlay data stored in the meeting database with the author of the overlay data (i.e. the participant who made the overlay annotations stored as the overlay data). Such information may be used, for example, to determine whether a user has access to a particular overlay data file (e.g. if the user ID of the user matches the author ID, the user is authenticated).

Another example of what may be stored in the meeting database (e.g. the database 104) is shown in FIG. 11. As shown in FIG. 11, overlay data access information keeps track of, for each overlay data stored in the meeting database, access information (e.g. configured by the author) of the overlay data. For example, the overlay data having a file ID of 1 has an access type of "public". Such access type may indicate that the overlay data is accessibly by anyone. In contrast, the overlay data having a file ID of 2 has an access type of "private" which may indicate that only the author of the overlay data may access the overlay data. In addition, other access types such as "presenter only", "admin only" and "same department only" shown in FIG. 11 may be used to indicate who may access the overlay data. The overlay data access information may also specify individual users or participants who are authorized to access the overlay data (e.g. any user with a user ID of 1, 3 or 5).

For example, whether a particular user has a certain status (e.g. presenter, admin or same department as the author) may be determined by accessing the participation information stored in the meeting database. The participation information may indicate whether a participant is a presenter at any of the meetings or an administrator, or to which department the participant belongs.

FIG. 12 shows saved content information stored in the meeting database according to an exemplary embodiment. The saved content information shown in FIG. 12, holds information about a plurality of content sources added to the overlay data of various meetings, along with the locations where the content retrieved from the plurality of content sources are stored.

As discussed in connection with FIG. 7, a participant may add an active link to a content source to a particular presentation, and when the conference data management apparatus receives such request, the active link to the content source is added to the overlay data of the particular presentation.

For example, in the table shown in FIG. 12, each of the rows is registered using (i) a unique file ID assigned to each content (i.e. file), (ii) a meeting ID corresponding to the particular meeting corresponding to the overlay data to which the active link to the content is added, (iii) the source location of the content, (iv) the location in which the content downloaded from the content source is stored, and (v) the time at which the archival took place (i.e. time of download).

With reference to FIG. 13, a method for recognizing a keyword in a specific overlay data according to an exemplary embodiment is described.

For example, the keyword extraction part 103b of the conference data management apparatus 103 performs character recognition on the overlay data received from the terminal 101 to obtain a set of recognized characters from the overlay annotations (e.g. comments handwritten by the participant in the margin of the presentation file) created by the participant (step S1301). Any convention character recognition technologies may be used.

Then, the keyword extraction part 103b performs graphic processing on the overlay data to extract any graphical mark that is present in the overlay data, such as underlining, circling, highlighting and etc. (step S1302). As discussed in connection with the system 100 shown in FIG. 1, the graphical marks may be used to recognize additional keywords marked by the participant in the presentation file. For example, character recognition may be performed again on the presentation file to recognize characters delimited by the extracted graphical marks.

The keyword extraction part 103b then associates the recognized keywords with the specific meeting in the meeting database. An example of such association is shown in FIG. 9 ("keyword information").

Figure 14A:
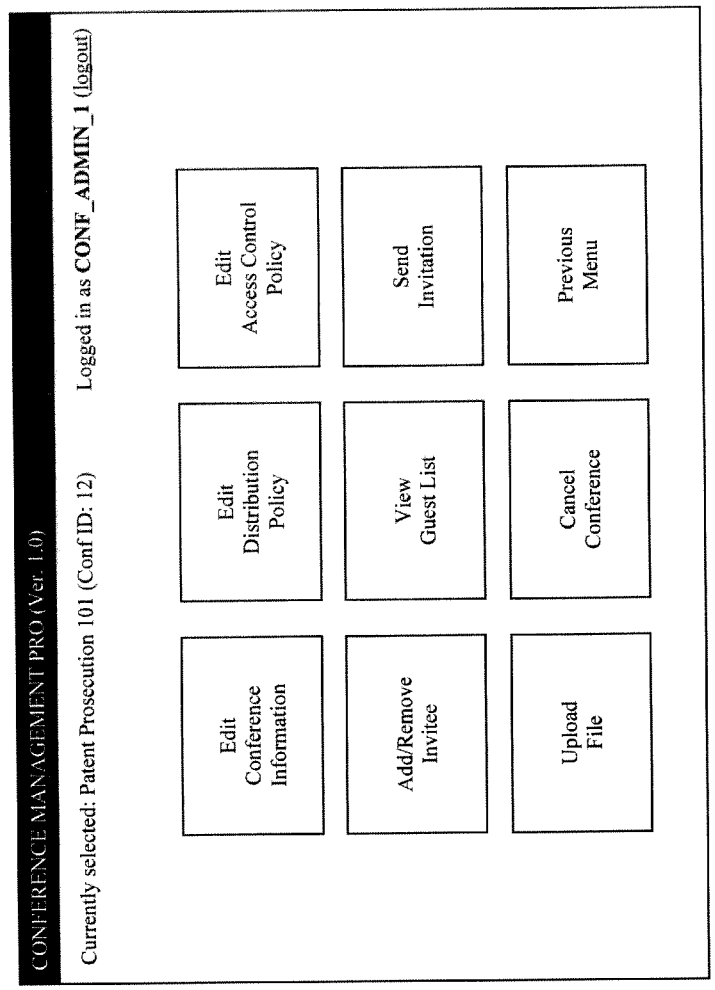
FIG. 14A shows a sample user interface according to an exemplary embodiment.

With reference to FIG. 14A, a sample window for a conference management UI (e.g. the conference management UI 127b of FIG. 1C) according to an exemplary embodiment is described.

As shown in FIG. 14A, the conference management UI includes buttons that lead to other screens for performing various tasks. The buttons shown in FIG. 14A include "Edit Conference Information" for entering and modifying conference information such as name, date, location and description; "Edit Distribution Policy" and "Edit Access Control Policy" for setting and modifying a distribution policy and an access control policy, respectively, which govern the operation of the conference data distribution unit (e.g. conference data distribution unit 123b of FIG. 1C); "Add/Remove Invitee" for adding and removing invitees to the conference;

"View Guest List" for viewing a list of guests registered for the conference; "Send Invitation" for sending an invitation to each of the selected invitees; "Upload File" for uploading various files (e.g. presentation slides and supplemental materials) to the conference database; "Cancel Conference" for canceling the currently selected conference; and "Previous Menu" for going back to the previous menu screen (e.g. a screen for selecting a conference).

The screen shows that the currently selected conference is "Patent Prosecution 101" which has a Conf ID of "12" and shows that the user is currently logged in as CONF_ADMIN_1.

With reference to FIG. 14B, a sample window for a registration UI (e.g. the registration UI 128b of FIG. 1C) according to an exemplary embodiment is described.

Upon successful authentication of the invitee, the request to register for the conference by the invitee causes the registration UI to display a registration screen such as shown in FIG. 14B. As shown in FIG. 14B, the participant registration window displays conference information (e.g. name, date and location) and allows the invitee to select either "attending" or "not attending" before submitting the response to the conference management system.

Figure 14C:
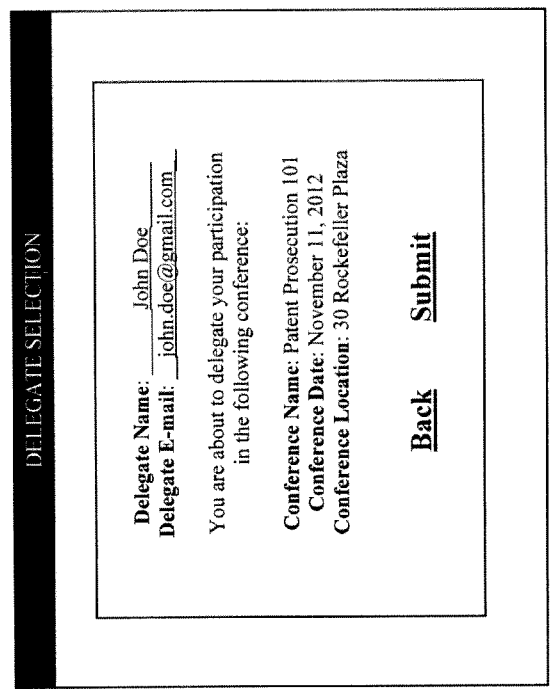
FIG. 14C shows another sample user interface according to an exemplary embodiment.

With reference to FIG. 14C, a sample window for a delegation UI (e.g. the delegation UI 128c of FIG. 1C) according to an exemplary embodiment is described.

As shown in FIG. 14C, the delegate selection window allows the invitee to specify the delegate name and e-mail address (or any other modes of communication). Once the invitee clicks "submit", an invitation to the conference is transmitted to the delegate specified by the invitee.

Figure 14D:
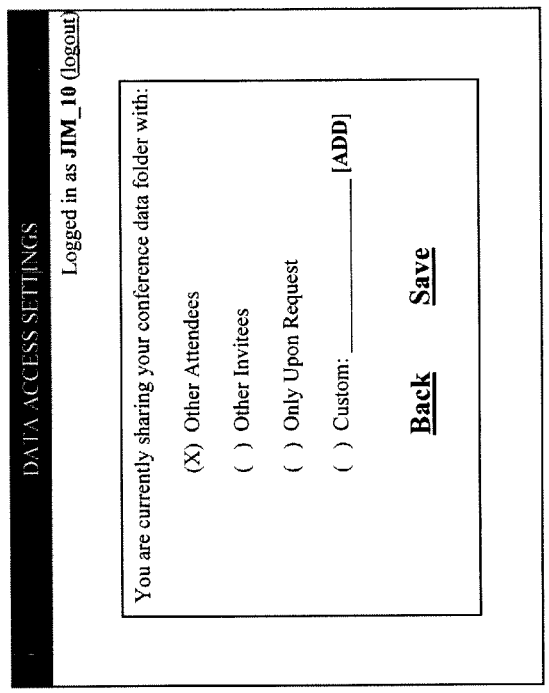
FIG. 14D shows another sample user interface according to an exemplary embodiment.

With reference to FIG. 14D, a sample window for a data access UI (e.g. the data access UI 128d of FIG. 1C) according to an exemplary embodiment is described.

As shown in FIG. 14D, the data access setting window, for example, allows the participant to specify to whom the participant wishes to grant access to his or her conference data folder. In the example shown in FIG. 14D, the participant may choose to share the conference data folder with other attendees, with other invitees, only upon request (e.g. after the participant approves the request of another participant to access the conference data folder), and with a customized list of candidates. Upon clicking "add", the participant may be allowed to choose from a list of invitees or attendees displayed to the participant.

With reference to FIG. 14E, a sample window for a data distribution UI (e.g. the data distribution UI 128e of FIG. 1C) according to an exemplary embodiment is described.

The participant may select a particular file from his or her conference data folder and choose to share the file with other participants of the conference. As shown in FIG. 14E, the data distribution request window allows the participant to specify recipients of the file selected by the participant. Once the participant submits the data distribution request, a copy of the selected file is placed in each of the recipients' conference data folders.

Figure 14F:
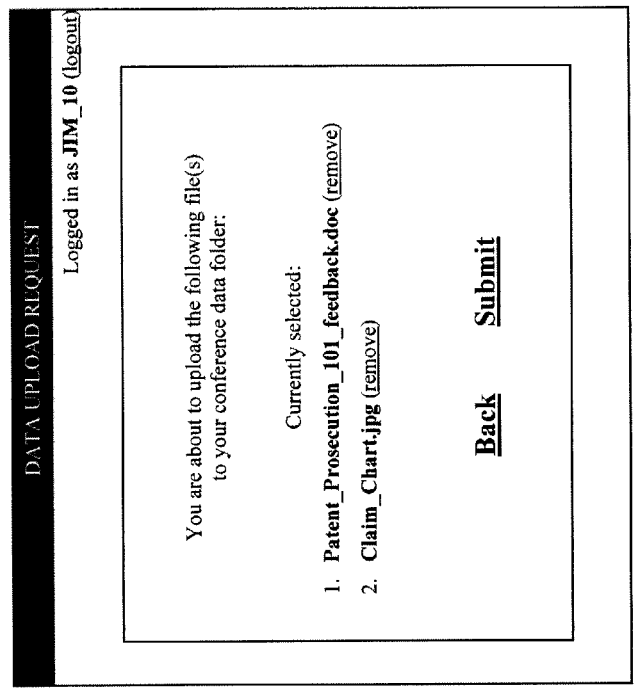
FIG. 14F shows another sample user interface according to an exemplary embodiment.

With reference to FIG. 14F, a sample window for an upload UI (e.g. the upload UI 128f of FIG. 1C) according to an exemplary embodiment is described.

The data upload request window allows the participant to upload files selected by the participant. Such files may be on the local hard drive of the participant's terminal device (i.e. laptop, tablet, mobile phone, etc.) or on a remote web space accessed via the Internet. Once the participant submits the data upload request, the selected files are placed in the participant's conference data folder.

Figure 14G:
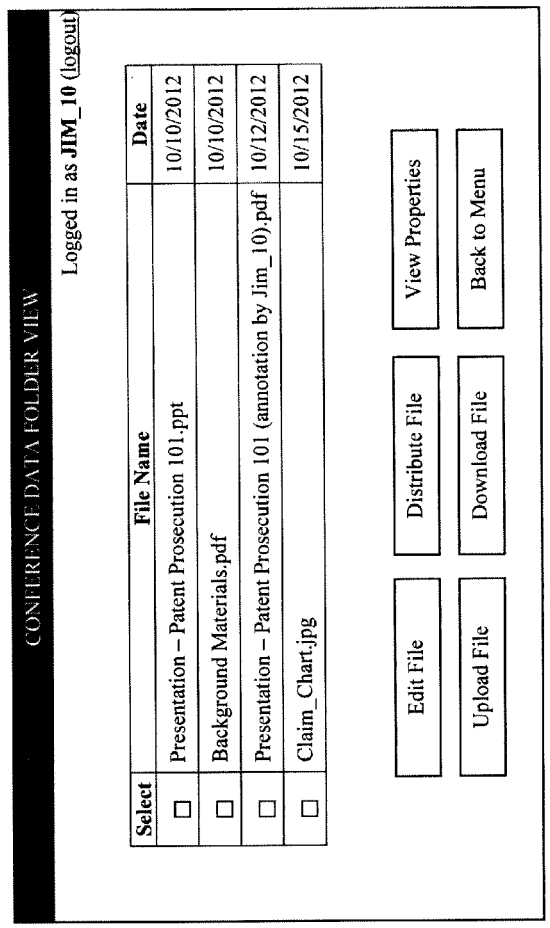
FIG. 14G shows another sample user interface according to an exemplary embodiment.

With reference to FIG. 14G, a sample representation of the conference data folder according to an exemplary embodiment is described.

As shown in FIG. 14G, the conference data folder view shows the list of files that are in the participant's conference data folder and displays the date on which each file was uploaded or modified. The participant can, for example, select any of the files and perform a variety of operations. The example of FIG. 14G shows six buttons which are "edit file" for editing the selected file, "distribute file" for distributing the selected file (e.g. FIG. 14E), "view properties" for viewing the properties of the selected file, "upload file" for uploading files from another location (e.g. local hard drive), "download file" for saving the selected file to another location (e.g. local hard drive) and "back to menu" for retreating back to the menu screen.

The conference data folder view window is not limited to such configuration and may display other properties and include other functionalities.

Figure 15A:
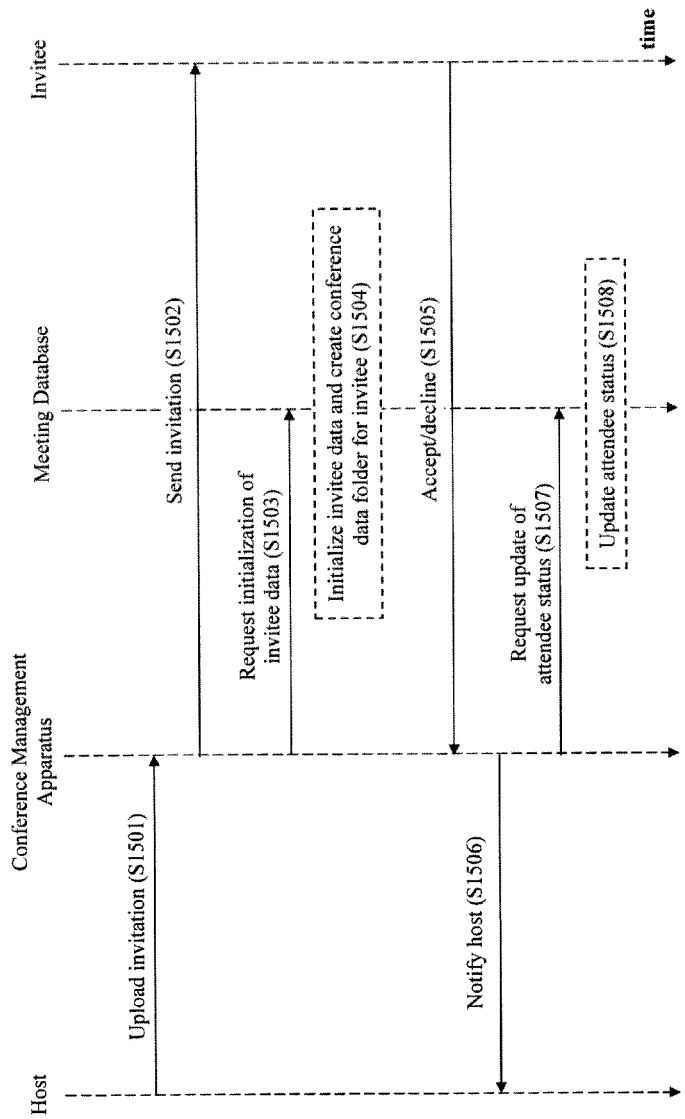
FIG. 15A shows a process of invitation and registration for a conference according to an exemplary embodiment.

With reference to FIG. 15A, a process of invitation and registration for a conference according to an exemplary embodiment is described.

A host, who may be at a terminal similar to the terminal 121 described in connection with FIG. 1C, submits a request to a conference management apparatus (e.g. conference management apparatus 123 of FIG. 1C) to invite a specified invitee to a conference hosted by the host (step S1401). In response, the conference management apparatus transmits an invitation to the specified invitee (step S1402), and initializes invitee data in the meeting database (e.g. conference database 124 of FIG. 1C) (steps S1403 and S1404), creating a conference data folder for the specified invitee in the meeting database (step S1404). For example, if other initial conference data for the conference/meeting has not been created in the meeting database (e.g. a meeting table, a participant table, a file link table, a file repository for files associated with the meeting, etc. discussed infra in connection with FIG. 17), such initial conference data may also be created in the meeting database.

Once the specified invitee responds to the invitation by accepting or declining the invitation (step S1405), the conference management apparatus notifies the host accordingly (S1406), and updates the attendee status of the invitee in the meeting database (steps S1407 and S1408). For example, if the invitee has accepted the invitation, the attendee status of the invitee is updated from "invited" to "accepted", and if the invitee has declined the invitation, the attendee status of the invitee is updated from "invited" to "declined".

Figure 15B:
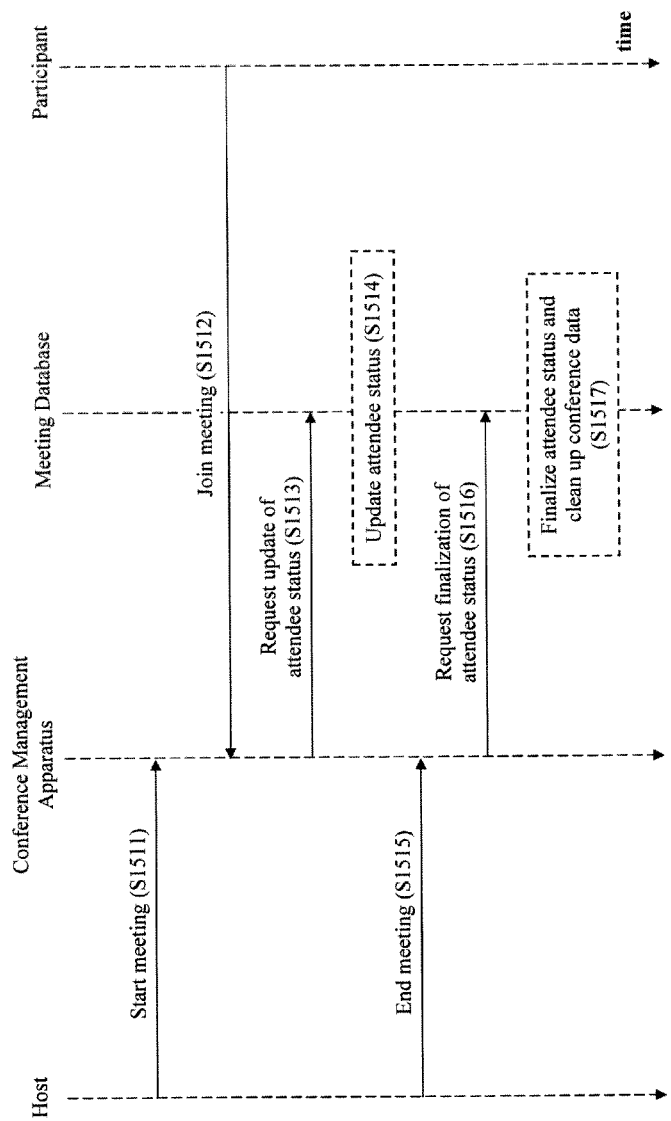
FIG. 15B shows a process of conducting a meeting according to an exemplary embodiment.

With reference to FIG. 15B, a process of conducting a meeting according to an exemplary embodiment is described.

A host starts a meeting, for example, by a sending a request to the conference management apparatus to start the meeting (step S1511). Similarly, a participant joins the meeting by requesting the conference management apparatus to join the meeting (step S1512). Upon the participant joining the meeting, the conference management apparatus updates the attendee status of the participant, for example, from "accepted" to "attended" (steps S1513 and S1514). When a meeting is ended by the host (step S1515), the attendee status is finalized (i.e. no longer modified or updated) (steps S1516 and S1517), and the conference data stored in the meeting database is cleaned up (step S1517), by deleting various items stored in the meeting database that are no longer necessary for the host or the invitees. For example, any overlay data information (e.g. files storing annotations created by the attendees) created for attendees who did not actually attend the meeting/conference are no longer needed and thus deleted from the meeting database.

Figure 16A:
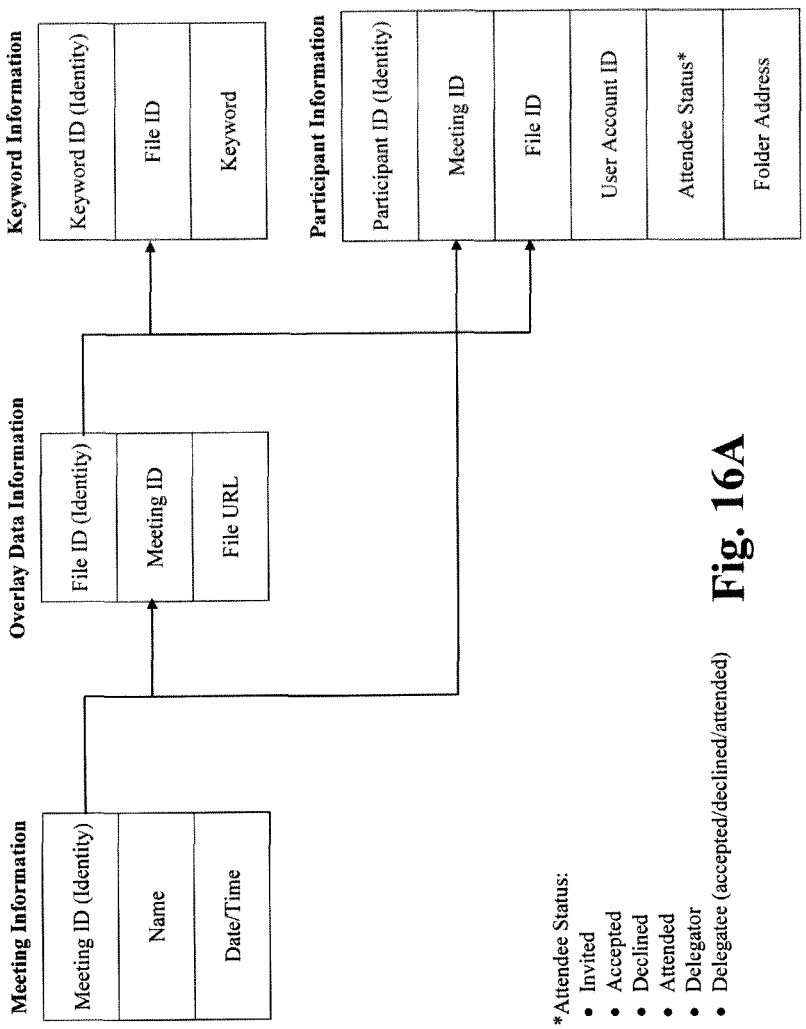
FIG. 16A shows another sample structure of tables stored in a meeting database in an exemplary embodiment.
Figure 16B:
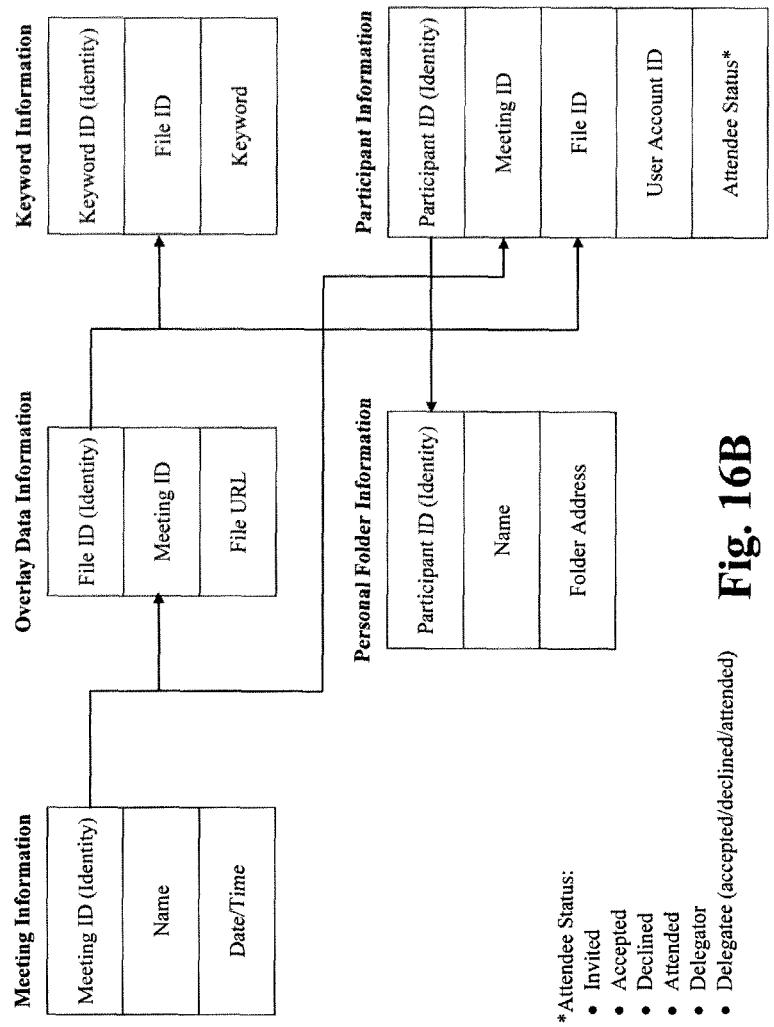
FIG. 16B shows another sample structure of tables stored in a meeting database in an exemplary embodiment.

FIGS. 16A and 16B show sample structures of tables stored in the meeting database in an exemplary embodiment. FIG. 17 shows tables stored in the meeting database in an exemplary embodiment, the tables corresponding to the structure shown in FIGS. 16A and 16B.

In the example of FIG. 16A, meeting information, overlay data information, keyword information and participant information, which are similar to those discussed supra with reference to FIGS. 8 and 9, are shown. In addition to the structure shown in FIGS. 8 and 9, the participation information table includes attendee status information which indicates the statuses of the invitees, and folder address information for the personal conference data folder maintained in the database for the invitees/participants of the conference. The participation information table may also include delegate information, as shown in FIG. 17, which links a particular invitee with a delegator or delegate when applicable.

The statuses may be "invited" for people who have been invited but have not yet responded to the invitation, "accepted" for invitees who have accepted the invitation, indicating that they will attend the conference/meeting, "declined" for invitees who have declined the invitation, indicating that they will not attend the conference/meeting, "attended" for invitees who have actually attended the conference/meeting, "delegator" for a non-attending invitee who has delegated participation to another person, and "delegatee" for someone who has been asked to attend the conference in place of another invitee.

The example of FIG. 16B shows another table labeled "personal folder information" which associates the participant ID and the participant name with a folder address for the participant's conference data folder. A sample content of such table is shown in FIG. 17.

As discussed above, in addition to the tables shown in FIGS. 16A, 16B and 17, the meeting database (e.g. conference database 124 of FIG. 1C) may include a file repository for storing files associated with the conference/meeting, a conference data folder for each invitee or participant for allowing each invitee/participant to access the conference data, modify the conference data, upload other files related to the conference and share data with other participants, and software for managing the content of such meeting database.

Figure 18:
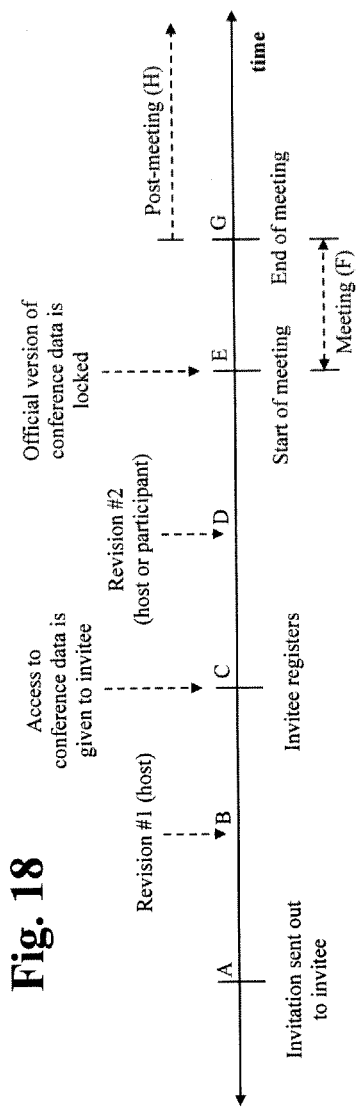
FIG. 18 shows a sample timeline illustrating various events that take place in connection with a conference according to an exemplary embodiment.

FIG. 18 shows a sample timeline illustrating various events that take place in connection with a conference according to an exemplary embodiment.

As shown in FIG. 18, an invitation is sent out to a specified invitee (A), and revision #1 is made to the conference data (e.g. by the host) (B). Then, when the invitee registers for the conference (C), access to the conference data is given to the invitee, and subsequently revision #2 is made (e.g. by the host or the participant) to the conference data (D). At the start of the conference (E), an official version of the conference data is locked and archived. Similarly, data that is uploaded and shared among the participants during the meeting (F) is also archived in the conference database. The end of the conference (G) marks the start of the post-meeting period (H), through which the discussions and sharing of data among the participants may continue.

Figure 19:
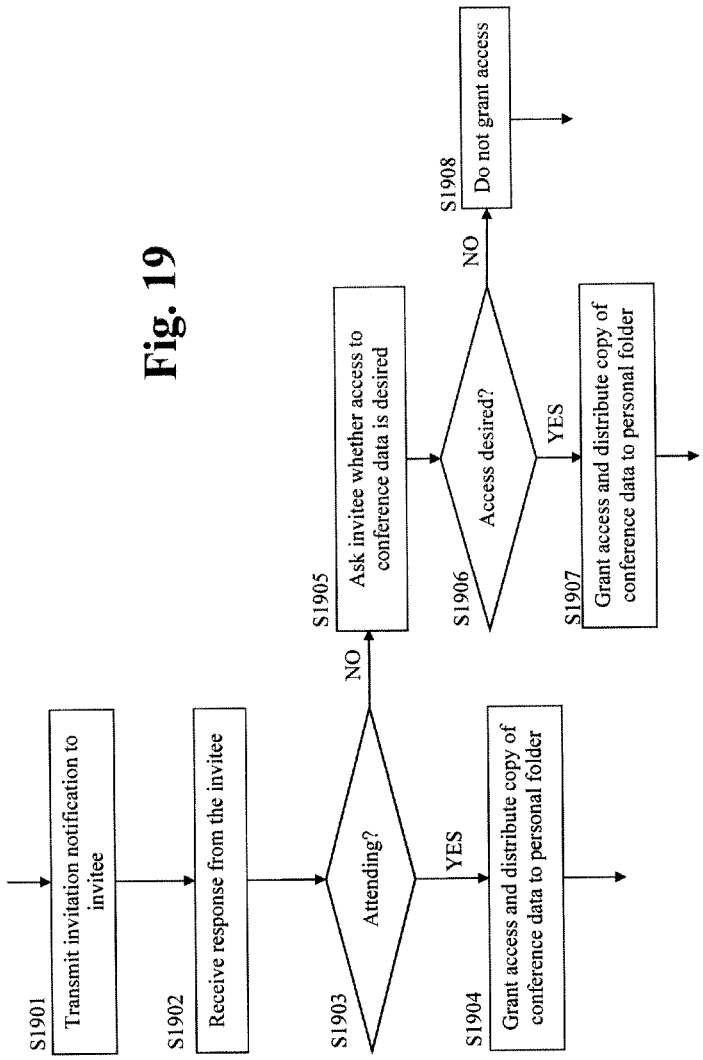
FIG. 19 shows a method of granting access to conference data according to an exemplary embodiment.

With reference to FIG. 19, a method of granting access to conference data according to an exemplary embodiment is described.

In the example shown in FIG. 19, an invitation notification is transmitted to the invitee (step S1901). Once a response is received from the invitee in response to the invitation (step S1902), it is checked whether the response indicates that the invitee will be attending the conference (step S1903). If the response indicates that the invitee will be attending the conference (YES, step S1903), access is granted to the invitee and a copy of the conference data is placed in the invitee's personal folder (i.e. conference data folder) maintained in the conference database (step S1904). If the response indicates that the invitee will not be attending the conference (NO, S1903), the invitee is given the option of requesting access to the conference data (step S1905). If the non-attending invitee wishes to be granted access to the conference data (YES, S1906), access is granted to the non-attending invitee and a copy of the conference data is placed in the invitee's personal folder (step S1907). Otherwise (NO, S1906), access is not granted to the non-attending invitee (step S1908).

The method of granting access to the conference data is not limited to the example of FIG. 19, and may include other requirements and considerations discussed herein, such as requiring that the invitee accept the invitation before the invitee is granted access to the conference data and/or checking whether the non-attending invitee has a delegate who has registered for the conference.

Figure 20:
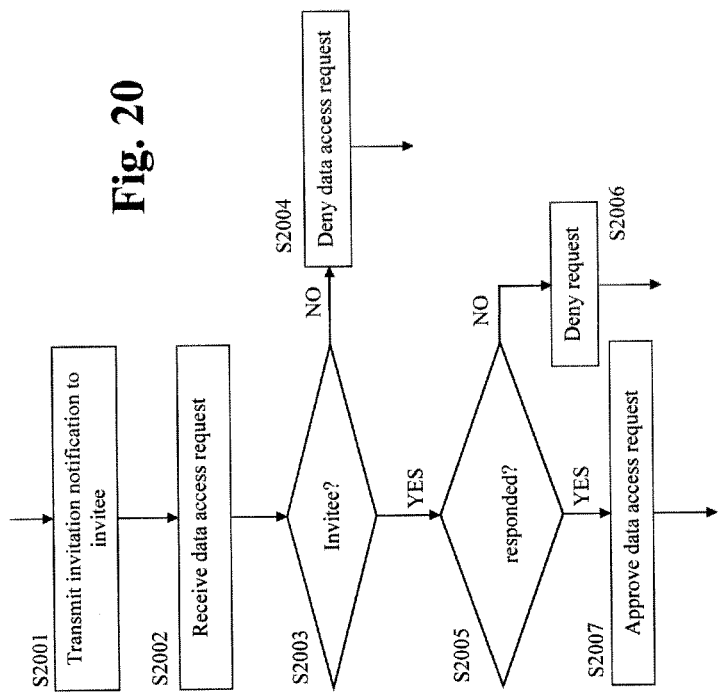
FIG. 20 shows a method of granting access to conference data according to an exemplary embodiment.

With reference to FIG. 20, a method of granting access to conference data according to another exemplary embodiment is described.

In the example shown in FIG. 20, an invitation notification is transmitted to the invitee (step S2001). Once a data access request is received (step S2002), it is checked whether the requester is an invitee of the conference (step S2003). The data access request preferably contains identification information of the requester which can be used, for example, to check whether the requester matches any of the entries in the table of invitees. If the requester is not an invitee (NO, S2003), the data access request is denied (step S2004). If the requester is an invitee (YES, S2003), it is checked whether the invitee has responded to the invitation (step S2005). If the invitee has responded to the invitation (YES, S2005), the data access request is approved (step S2007), and otherwise, the data access request is denied (step S2006).

Figure 21:
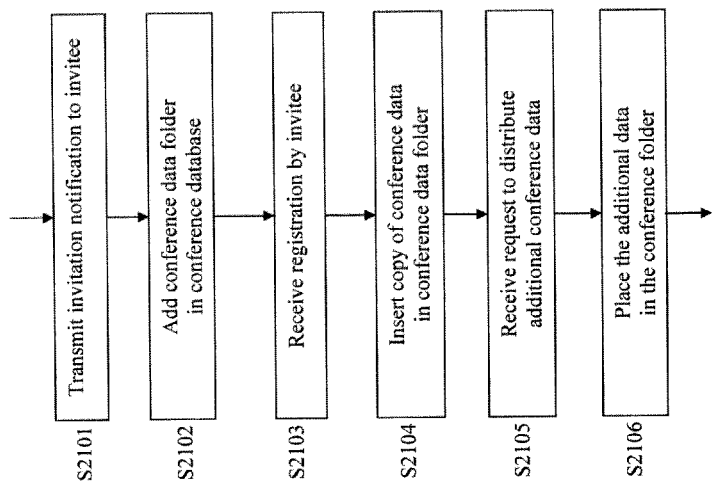
FIG. 21 shows a process of inviting an invitee and initializing invitee data according to an exemplary embodiment.

With reference to FIG. 21, a process of inviting an invitee and initializing invitee data according to an exemplary embodiment is described.

In the example shown in FIG. 21, an invitation notification is transmitted to the invitee (step S2101), and a conference data folder for the invitee is added in the conference database (step S2102). Once the invitee registers for the conference (step S2103), a copy of the conference data is inserted in the invitee's conference data folder (step S2104). Additionally, upon receiving a request to distribute additional conference data from the invitee (step S2105), the additional conference data is placed in the invitee's conference data folder (step S2106). For example, the invitee/participant may want to save in the conference data folder other data not initially inserted in the conference data folder. Such data may come from other participants' conference data folders, a remote storage device accessible via a network, or the local hard drive of the participant's terminal device (i.e. laptop, tablet, handset, etc.).

Figures 22A, 22B:
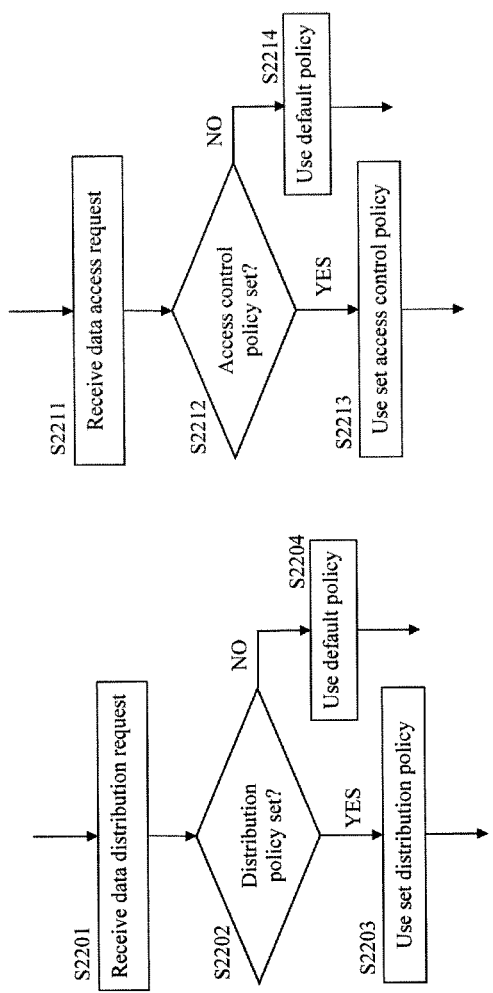
FIGS. 22A and 22B show a method of controlling conference data using distribution and access control policies, according to an exemplary embodiment.

With reference to FIGS. 22A and 22B, a method of using distribution and access control policies according to an exemplary embodiment is described.

In FIG. 22A, upon receiving a data distribution request (step S2201), it is checked whether a distribution policy has been set, for example, by the organizer of the conference (step S2202). If a distribution policy has been set (YES, S2202), the set distribution policy is used for assessing the data distribution request (step S2203). If a distribution policy has not been set (NO, S2202), a default distribution policy is used (step S2204).

Similarly, in FIG. 22B, upon receiving a data access request (step S2211), it is checked whether an access control policy has been set, for example, by the organizer of the conference (step S2212). If an access control policy has been set (YES, S2212), the set access control policy is used for assessing the data access request (step S2213). If an access control policy has not been set (NO, S2212), a default access control policy is used (step S2214).

Figure 23:
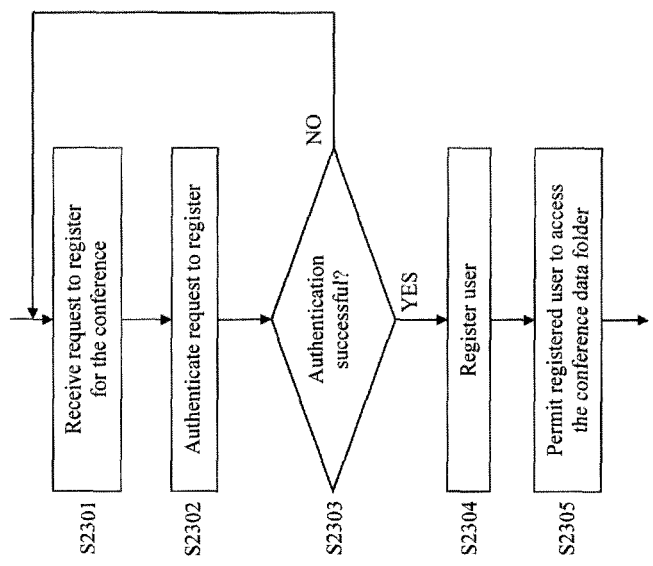
FIG. 23 shows a method of registering an invitee, according to an exemplary embodiment.

With reference to FIG. 23, a method of registering an invitee according to an exemplary embodiment is described.

In the example of FIG. 23, a request to register for the conference is received from an invitee (step S2301). The request is authenticated, for example, by checking whether the identification information provided by the invitee matches any of the entries in the table of invitees (step S2302). The authentication may be performed by the authentication unit (e.g. the authentication unit 128a of FIG. 1C) of a conference application provided to the invitee. If the authentication is successful (YES, S2303), the invitee is registered for the conference (step S2304) and permitted access to the conference data folder (step S2305), including the various services offered in connection with the conference data folder such as upload, download, distribute, etc.

Figure 24:
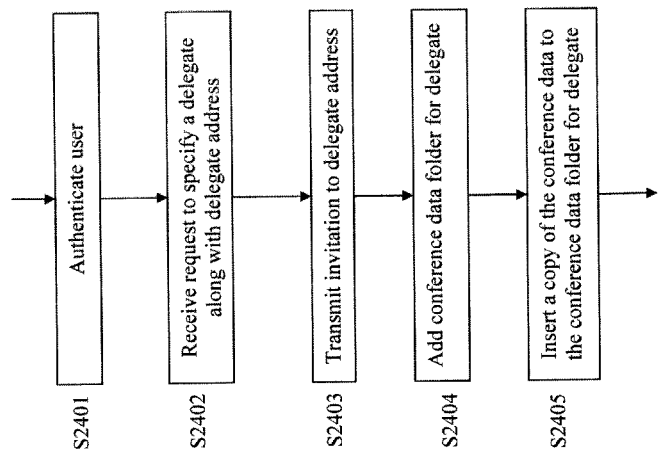
FIG. 24 shows a method of processing a delegation request, according to an exemplary embodiment.

With reference to FIG. 24, a method of processing a delegation request according to an exemplary embodiment is described.

In the example of FIG. 24, a user is first authenticated (step S2401). When a delegation request is received from the authenticated user (step S2402), an invitation is transmitted to delegate address provided by the authenticated user (step S2403). Then, a conference data folder for the delegate is added in the conference database (step S2404), and a copy of the conference data is inserted in the conference data folder (step S2405).

With reference to FIG. 25, a method of handling registration of a delegate according to an exemplary embodiment is described.

In the example of FIG. 25, when a response is received from a delegate (i.e. delegatee) (step S2501), it is checked whether the response indicates that the delegate will be attending the conference (step S2502). If the response indicates that the delegate will be attending the conference (YES, S2502), a copy of the conference data is inserted in the conference data folder maintained in the conference database for the non-attending invitee who has delegated participation in the conference to the delegate (step S2504). If the response indicates that the delegate will not be attending the conference, a copy of the conference data is not inserted in the non-attending invitee's conference data folder (step S2503).

With reference to FIG. 26, a method of processing a distribution request according to an exemplary embodiment is described.

In the example of FIG. 26, when a data distribution request is received from a participant (step S2601) along with a list of recipients to whom the data is to be distributed (step S2602), the data is placed in the recipients' conference data folders (step S2603). For example, the participant may want to distribute to other participants his or her commentary in response to the argument to be presented by a presenter at the conference. In such a case, the commentary can be placed in the personal folder of each of the recipients specified by the participant.

The order in which the steps are performed is not limited to the particular order discussed herein, and the steps may be performed in a different order to achieve a similar result. For example, in the example of FIG. 23, the authentication step (S2302) may be performed before receiving the request to register for the conference (S2301). In one embodiment, a user may be asked to provide identification information (e.g. login credentials) before making any kind of requests. In another embodiment, such identification information may be asked only upon the user making a request.

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A conference management apparatus for managing conference data corresponding to a specific meeting in a conference database, the conference management apparatus comprising a non-transitory medium tangibly embodying a program of Instructions executable by a computer to configure the computer to include:

an invitation notification part that causes an electronic notification to be transmitted to each specific invitee amongst plural invitees, to invite the specific invitee to the specific meeting and request the specific invitee to respond to the invitation;

a conference data distribution part that adds to the conference database, for said each specific invitee, a conference data folder for access only by the specific invitee; and a conference management user interface configured for setting an access control policy, and for controlling access to the conference data folder according to the access control policy, wherein the conference data distribution part analyzes responses by the invitees to the invitation to the specific meeting, and for each particular invitee who registers to attend the specific meeting, inserts a copy of the conference data in the conference data folder for the particular invitee, and upon receiving a request to distribute additional conference data, places a copy of said additional conference data in the conference data folder maintained in the conference database for the particular invitee who registered to attend the specific meeting, and wherein the access control policy includes an option to permit an invitee to specify who is granted access to the conference data folder of the invitee, and also includes an option to limit sharing of the conference data folder of the invitee to be shared with other invitees only upon request.

2. The conference management apparatus of claim 1, wherein the conference management user interface is further configured for entry of conference information and for setting a distribution policy, and wherein the conference data distribution part distributes the conference data according to the distribution policy.

3. The conference management apparatus of claim 2, wherein in a case that the conference management user interface has not been operated to set the distribution policy, the conference data distribution part distributes the conference data according to a default policy, and under the default policy, when a non-attending invitee indicates, in response to the electronic notification, that the non-attending invitee cannot attend the specific meeting, the conference data distribution part inserts a copy of the conference data in the conference data folder maintained in the conference database for the non-attending invitee.

4. The conference management apparatus of claim 2, wherein in a case that the conference management user interface has not been operated to set the distribution policy, the conference data distribution part distributes the conference data according to a default policy, and under the default policy, when a non-attending invitee indicates, in response to the electronic notification, that the non-attending invitee cannot attend the specific meeting, the conference data distribution part inserts a link to the conference data in the conference data folder for the non-attending invitee.

5. The conference management apparatus of claim 1, wherein in a case that the conference management user interface has not been operated to set the access control policy, the conference data distribution part controls access to the conference data folder according to a default policy, and under the default policy, when an unresponsive invitee has not responded to the electronic notification, the unresponsive invitee is not permitted access to the conference data folder maintained in the conference database for the unresponsive invitee.

6. The conference management apparatus of claim 1, further comprising
a conference application part that provides a conference application through a network, the conference application including
an authentication part that authenticates a request received through the network from a requesting terminal to register as an invitee to the specific meeting, and
a registration user interface that allows, upon authentication of the request to register from the requesting terminal, the requesting terminal to register for the specific meeting as a registrant,
wherein the conference data distribution part permits the registrant to access the conference data folder, including uploading one or more of notes and additional data to the conference data folder.

7. The conference management apparatus of claim 6, further comprising
a data access user interface for the registrant to set or modify a folder access policy governing access by others to the conference data folder maintained in the conference database for the registrant.

8. The conference management apparatus of claim 6, further comprising
a data distribution user interface for the registrant to specify data to be distributed to other registrants.

9. The conference management apparatus of claim 1, further comprising
a conference application part that provides a conference application through a network, wherein the conference application includes
an invitee authentication part that authenticates a request received through the network from a participant terminal to participate in the specific meeting, and
a delegation user interface that allows a non-attending invitee to delegate participation to a delegate in place of the non-attending invitee, including a delegate notification address.

10. The conference management apparatus of claim 9, wherein the conference data distribution part, upon the conference management apparatus receiving the delegation of the delegate in place of the non-attending invitee, adds to the conference database a delegated participant folder for access only by the delegate and inserts a copy of the conference data in the delegated participant folder for the delegate.

11. The conference management apparatus of claim 9, wherein
the invitation notification part, upon the conference management apparatus receiving the delegation of the delegate in place of the non-attending invitee, transmits an electronic notification requesting the delegate to register for the specific meeting, and
the conference data distribution part, upon the delegate registering for the specific meeting in place of the non-attending invitee, adds to the conference database a delegated participant folder for access only by the delegate and inserts a copy of the conference data in the delegated participant folder for the delegate.

12. The conference management apparatus of claim 11, wherein
the conference data distribution part, upon the delegate registering for the specific meeting in place of the non-attending invitee, inserts a copy of the conference data in the folder maintained in the database for the non-attending invitee.

13. The conference management apparatus of claim 1, further comprising
a data archiving part that archives, at approximately a scheduled meeting time of the specific meeting, the conference data and, for said each specific invitee, data in the conference data folder of the specific invitee, maintained in the conference database for the specific meeting, at said scheduled meeting time, as pre-meeting data,
wherein said pre-meeting data is prohibited from change thereto, after the data is archived at said scheduled meeting time.

14. A system for managing conference data corresponding to a specific meeting, the system comprising:
a conference database that captures the conference data for the specific meeting;
a non-transitory medium tangibly embodying a program of Instructions executable by a computer to configure the computer to include a conference data management part that adds to the conference database, for each specific invitee amongst plural invitees, a conference data folder for access only by the specific invitee; and
a conference management user interface configured for setting an access control policy, and for controlling access to the conference data folder according to the access control policy,
wherein the conference data management part analyzes responses by the invitees to an electronic invitation to the specific meeting, and for each particular invitee who registers to attend the specific meeting, inserts a copy of the conference data in the conference data folder for the particular invitee, and upon receiving a request to distribute additional conference data, places a copy of said additional conference data in the conference data folder maintained in the conference database for the particular invitee who registered to attend the specific meeting, and
wherein the access control policy includes an option to permit an invitee to specify who is granted access to the conference data folder of the invitee, and also includes an option to limit sharing of the conference data folder of the invitee to be shared with other invitees only upon request.

15. The system of claim 14, wherein the conference data management part automatically distributes the conference data according to a distribution policy which specifies whether and how the conference data is to be distributed to the invitees.

16. The system of claim 14, wherein the conference data management part automatically distributes the conference data according to a distribution policy that specifies whether a copy of the conference data is to be inserted in the conference data folder of an invitee, a link to the conference data is to be inserted in the conference data folder, or access by the invitee to the conference data is not to be permitted, depending on invitee status.

17. The system of claim 14, wherein
the conference data management part archives a version of the conference data at a scheduled meeting time of the specific meeting in the conference database as pre-meeting data, and
the pre-meeting data is prohibited from being modified after the pre-meeting data is archived at the scheduled meeting time.

18. The system of claim 14, wherein for each one of the responses by the invitees delegating participation in the specific meeting to a delegate in place of the invitee, the conference data management part adds to the conference database a delegated participant folder for access by only the delegate and inserts a copy of the conference data in the delegated participant folder for the delegate.

19. The system of claim 14, wherein for each one of the responses by the invitees delegating participation in the specific meeting to a delegate in place of the invitee, the conference data management part inserts a copy of the conference data in the conference data folder maintained for the invitee in the conference database.

20. The system of claim 14, wherein the conference data management part, by request of the particular invitee, distributes data specified by the particular invitee to other invitees from the conference data folder maintained in the conference database for the particular invitee.

* * * * *